US011689561B2

(12) United States Patent
Seifert et al.

(10) Patent No.: US 11,689,561 B2
(45) Date of Patent: Jun. 27, 2023

(54) DETECTING UNKNOWN MALICIOUS CONTENT IN COMPUTER SYSTEMS

(71) Applicant: MICROSOFT TECHNOLOGY LICENSING, LLC, Redmond, WA (US)

(72) Inventors: Christian Seifert, Seattle, WA (US); Jack Wilson Stokes, III, North Bend, WA (US); Kristian Holsheimer, Abbotsford (AU)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 270 days.

(21) Appl. No.: 16/821,722

(22) Filed: Mar. 17, 2020

(65) Prior Publication Data
US 2021/0141897 A1 May 13, 2021

Related U.S. Application Data

(60) Provisional application No. 62/933,817, filed on Nov. 11, 2019.

(51) Int. Cl.
*H04L 9/40* (2022.01)
*G06F 21/56* (2013.01)
(Continued)

(52) U.S. Cl.
CPC .............. *H04L 63/145* (2013.01); *G06F 9/54* (2013.01); *G06F 18/2148* (2023.01);
(Continued)

(58) Field of Classification Search
CPC .... G06F 21/561; G06F 21/563; G06F 21/565; G06F 20/00; G06V 10/82
See application file for complete search history.

(56) References Cited

U.S. PATENT DOCUMENTS 8,375,450 B1 * 2/2013 Oliver ................... G06F 21/564
713/181
9,558,348 B1 1/2017 Muttik
(Continued)

OTHER PUBLICATIONS

L. Singh and M. Hofmann, "Dynamic behavior analysis of android applications for malware detection," 2017 International Conference on Intelligent Communication and Computational Techniques (ICCT), 2017, pp. 1-7, doi: 10.1109/INTELCCT.2017.8324010. (Year: 2017).*
(Continued)

*Primary Examiner* — Robert B Leung
(74) *Attorney, Agent, or Firm* — Shook, Hardy & Bacon L.L.P.

(57) ABSTRACT

Various embodiments discussed herein enable the detection of malicious content. Some embodiments do this by determining a similarity score between content, computer objects, or indications (e.g., vectors, file hashes, file signatures, code, etc.) known to be malicious and other content (e.g., unknown files) or indications based on feature weighting. Over various training stages, certain feature characteristics for each labeled malicious content or indication can be learned. For example, for a first malware family of computer objects, the most prominent feature may be a particular URL, whereas other features change considerably for different iterations of the first malware family of computer objects. Consequently, the particular URL can be weighted to determine a particular output classification corresponding to malicious behavior.

20 Claims, 14 Drawing Sheets

(51) Int. Cl.

| | |
|---|---|
| G06N 20/00 | (2019.01) |
| G06F 9/54 | (2006.01) |
| G06F 18/214 | (2023.01) |
| G06V 10/764 | (2022.01) |
| G06V 10/82 | (2022.01) |

(52) U.S. Cl.
CPC .......... *G06F 21/561* (2013.01); *G06F 21/563* (2013.01); *G06F 21/565* (2013.01); *G06N 20/00* (2019.01); *G06V 10/764* (2022.01); *G06V 10/82* (2022.01)

(56) References Cited

U.S. PATENT DOCUMENTS

| | | | |
|---|---|---|---|
| 9,690,938 | B1 | 6/2017 | Saxe et al. |
| 9,996,693 | B2* | 6/2018 | Sun .................. G06F 21/566 |
| 2012/0317644 | A1* | 12/2012 | Kumar ............... G06F 21/552 726/24 |
| 2012/0323829 | A1* | 12/2012 | Stokes ................ G06K 9/62 706/50 |
| 2013/0097704 | A1* | 4/2013 | Gavrilut ............. G06N 3/02 726/23 |
| 2015/0128263 | A1 | 5/2015 | Raugas et al. |
| 2019/0026466 | A1* | 1/2019 | Krasser .............. G06N 20/20 |
| 2019/0251251 | A1 | 8/2019 | Carson |
| 2019/0372934 | A1* | 12/2019 | Yehudai .............. G06F 18/23 |
| 2020/0057854 | A1* | 2/2020 | Wojnowicz .......... G06N 7/005 |
| 2020/0364338 | A1* | 11/2020 | Ducau ............... G06F 21/564 |

OTHER PUBLICATIONS

J. W. Stokes, C. Seifert, J. Li and N. Hejazi, "Detection of Prevalent Malware Families with Deep Learning," MILCOM 2019—2019 IEEE Military Communications Conference (MILCOM), 2019, pp. 1-8, doi: (Year: 2019).*

Xu, Y., Wu, C., Zheng, K., Wang, X., Niu, X. and Lu, T., 2017. Computing adaptive feature weights with PSO to improve Android malware detection. Security and Communication Networks, 2017. (Year: 2017).*

Aafer, et al., "DroidAPIMiner: Mining API-Level Features for Robust Malware Detection in Android", In Proceedings of International Conference on Security and Privacy in Communication Systems, Sep. 25, 2013, 18 Pages.

Balzarotti, et al., "Efficient Detection of Split Personalities in Malware", In Proceedings of the Annual Network and Distributed System Security Symposium, Feb. 2010, 16 Pages.

Bayer, et al., "Scalable, Behavior-Based Malware Clustering", In Journal of Annual Network and Distributed System Security Symposium, vol. 9, Feb. 2009, 18 Pages.

Benchea, et al., "Combining Restricted Boltzmann Machine and One Side Perceptron for Malware Detection", In Proceedings of International Conference on Conceptual Structures, Jul. 27, 2014, pp. 93-103.

Bishop, C M., "Pattern Recognition and Machine Learning", In Publication of Springer, 2006, 758 Pages.

Bromley, et al., "Signature Verification Using a "Siamese" Time Delay Neural Network", In Proceedings of the 6th International Conference on Neural Information Processing Systems, Nov. 2013, pp. 737-744.

Chen, et al., "Towards an Understanding of Anti-Virtualization and Anti-Debugging Behavior in Modern Malware", In Proceedings of IEEE International Conference on Dependable Systems and Networks With FTCS and DCC (DSN), Jun. 24, 2008, pp. 177-186.

Dahl, et al., "Large-Scale Malware Classification Using Random Projections and Neural Networks", In Proceedings of IEEE International Conference on Acoustics, Speech and Signal Processing, May 26, 2013, pp. 3422-3426.

Hegedus, et al., "Methodology for Behavioral-based Malware Analysis and Detection Using Random Projections and K-Nearest Neighbors Classifiers", In Proceedings of Seventh International Conference on Computational Intelligence and Security, Dec. 3, 2011, 08 Pages.

Huang, et al., "Learning Deep Structured Semantic Models for Web Search Using Clickthrough Data", In the Proceedings of the 22nd ACM International Conference on Information & Knowledge Management, Oct. 27, 2013, pp. 2333-2338.

Idika, et al., "A Survey of Malware Detection Techniques", In Thesis Submitted to Department of Computer Science, Purdue University, Feb. 2, 2007, 48 Pages.

Jacob, et al., "A Static, Packer-Agnostic Filter to Detect Similar Malware Samples", In Proceedings of International Conference on Detection of Intrusions and Malware, and Vulnerability Assessment, Jul. 26, 2012, 20 Pages.

Jang, et al., "Bitshred: Feature Hashing Malware for Scalable Triage and Semantic Analysis", In Proceedings of the 18th ACM Conference on Computer and Communications Security, Oct. 17, 2011, pp. 309-320.

Johnson, et al., "Billion-Scale Similarity Search with GPUs", In Journal of Computing Research Repository, Feb. 28, 2017, 12 Pages.

Kephart, Jeffrey O., "A Biologically Inspired Immune System for Computers", In Proceedings of the Fourth International Workshop on the Synthesis and Simulation of Living Systems, Jul. 6, 1994, 10 Pages.

Kirat, et al., "BareCloud: Bare-metal Analysis-based Evasive Malware Detection", In Proceedings of the 23rd USENIX Security Symposium, Aug. 20, 2014, pp. 287-301.

Kong, et al., "Discriminant malware distance learning on structural information for automated malware classification", In Proceedings of the 19th ACM SIGKDD International Conference on Knowledge Discovery and Data Mining, Aug. 11, 2013, pp. 1357-1365.

Li, et al., "On Challenges in Evaluating Malware Clustering", In Proceedings of International Workshop on Recent Advances in Intrusion Detection, Sep. 15, 2010, pp. 238-255.

Lindorfer, et al., "Detecting Environment-Sensitive Malware", In International Workshop on Recent Advances in Intrusion Detection, Sep. 20, 2011, 20 Pages.

Maaten, et al., "Visualizing Data Using t-SNE", In Journal of Machine Learning Research, vol. 9, Nov. 2008, pp. 2579-2605.

Manning, et al., "Introduction to Information Retrieval", In Cambridge University Press, 2009, 581 Pages.

Paleari, et al., "A fistful of red-pills: How to automatically generate procedures to detect CPU emulators", In Proceedings of the USENIX Workshop on Offensive Technologies, Aug. 10, 2009, 07 Pages.

Papernot, et al., "The Limitations of Deep Learning in Adversarial Settings", In Proceedings of IEEE European Symposium on Security and Privacy, Mar. 21, 2016, pp. 372-387.

Pascanu, et al., "Malware Classification with Recurrent Networks", In Proceedings of IEEE International Conference an Acoustics, Speech and Signal Processing, Apr. 19, 2015, 5 Pages.

Perdisci, et al., "Behavioral Clustering of HTTP-Based Malware and Signature Generation Using Malicious Network Traces", In Proceedings of the USENIX Symposium on Networked Systems Design and Implementation, vol. 10, Apr. 28, 2010, 14 Pages.

Raffetseder, et al., "Detecting System Emulators", In Proceedings of the 10th International Conference on Information Security, Oct. 9, 2007, 18 Pages.

Rafique, et al., "FIRMA: Malware Clustering and Network Signature Generation with Mixed Network Behaviors", In Proceedings of International Workshop on Recent Advances in Intrusion Detection, Oct. 23, 2013, 20 Pages.

Rajaraman, et al., "Mining of Massive Datasets", In Cambridge University Press, Second Edition, 2014, 513 Pages.

Saxe, et al., "Deep Neural Network Based Malware Detection Using Two Dimensional Binary Program Features", In Proceedings of 10th International Conference on Malicious and Unwanted Software, Oct. 20, 2015, pp. 11-20.

Stock, et al., "Kizzle: A Signature Compiler for Exploit Kits", In Proceedings of International Conference on Dependable Systems and Networks, Feb. 2015, 15 Pages.

(56) References Cited

OTHER PUBLICATIONS

Stokes, et al., "Attack and Defense of Dynamic Analysis-Based, Adversarial Neural Malware Detection Models", In Proceedings of IEEE Military Communications Conference, Oct. 29, 2018, pp. 102-109.

"International Search Report & Written Opinion issued in PCT Application No. PCT/US2020/056692", dated Dec. 17, 2020, 24 pages.

* cited by examiner

| FAMILY | TRAINING SET | | | | TEST SET | | | |
|---|---|---|---|---|---|---|---|---|
| | FILE COUNT | DISSIMILAR PAIR COUNT | SIMILAR PAIR COUNT | | FILE COUNT | DISSIMILAR PAIR COUNT | SIMILAR PAIR COUNT | |
| ARDUNK | 15793 | 36592 | 37194 | | 8272 | 14828 | 25545 | |
| CLEAN | 130787 | NA | NA | | 77274 | NA | NA | |
| DINWOD | 15472 | 35014 | 37127 | | 7281 | 12979 | 25809 | |
| NABUCUR | 12097 | 26895 | 37987 | | 6475 | 11364 | 29524 | |
| PICSYS | 16578 | 40267 | 37350 | | 9072 | 16547 | 22610 | |
| SFONE | 18299 | 47796 | 37167 | | 10296 | 19255 | 16002 | |
| SIVIS | 15907 | 36704 | 37330 | | 7959 | 14221 | 25572 | |
| SOLTERN | 12164 | 26389 | 38031 | | 6403 | 11311 | 30435 | |
| TESCRYPT | 18220 | 47214 | 37421 | | 10258 | 19057 | 16728 | |
| TOTAL | 255317 | 296871 | 299607 | | 143290 | 119562 | 192225 | |

*FIG. 9.*

| FAMILY | SNN | JI |
|---|---|---|
| ARDUNK | 0.0000% | 0.0000% |
| CLEAN | 0.0060% | 0.3200% |
| DINWOD | 0.0000% | 0.0000% |
| NABUCUR | 0.0310% | 3.3300% |
| PICSYS | 0.0000% | 0.0000% |
| SFONE | 0.0000% | 0.0000% |
| SIVIS | 0.0500% | 0.0000% |
| SOLTERN | 0.0000% | 0.0000% |
| TESCRYPT | 0.0100% | 0.1400% |
| ALL (AVG) | 0.0110% | 0.4200% |

DETECTING UNKNOWN MALICIOUS CONTENT IN COMPUTER SYSTEMS

CROSS-REFERENCE TO RELATED APPLICATIONS

This application claims the benefit of U.S. Provisional Application No. 62/933,817 titled "Detecting Unknown Malicious Content in Computer Systems," filed Nov. 11, 2019, which is hereby expressly incorporated by reference in its entirety.

INTRODUCTION

Computer systems can become infected with malicious content (e.g., malware), which can cause damage or allow cyber attackers to gain unauthorized access to these computer systems. There are various known families and subfamilies of malicious content, such as viruses, Trojans, worms, Ransomware, and the like. Detecting malicious content remains a significant challenge for existing technologies, particularly when there are unknown or new variants. Cyber attackers continually change and evolve malicious content over time in order to evade detection. This amount of change varies from family to family, making it difficult to detect the presence of malicious behavior.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Various embodiments discussed herein enable the detection of malicious content. Some embodiments do this by determining a similarity score between known malicious content or indications (e.g., vectors, file hashes, file signatures, code, etc.) that represent the malicious content and other content (e.g., unknown files) or indications that represent the other content based on feature weighting. Over various training stages, certain feature characteristics for each labeled content or indication can be learned. For example, for a first malware family, the most prominent feature may be a particular URL, whereas other features change considerably (e.g., due to cyber attacker modifications) for different iterations of the first family. Consequently, the particular URL can be weighted to determine a particular output classification. In this way, embodiments learn weights corresponding to different features such that important features found in similar malicious content and from the same family contribute positively to a similarity score and features that distinguish malicious content from benign (not malicious) content contribute negatively to a similarity score. Therefore, malicious content can be detected even if cyber attackers introduce unknown or new variants of malicious content. Further, this allows some embodiments to determine what family the malicious content belongs to.

In some embodiments, unique deep learning models, such as variations of a Siamese Neural Network (SNN) or variations of a Deep Structured Semantic Model (DSSM) can be used to detect unknown malicious content. Certain embodiments train a model that learns to give different weights to features based on their importance. In this way, deep learning model embodiments can be useful for taking unknown content or indications and mapping them in feature space to determine a distance or similarity to known malicious files or indications based on the particular features of the unknown file and the trained weights associated with the features of known files or indications.

Existing technologies have various shortcomings, leading to lower prediction accuracy and higher error rate, among other things. For example, existing tools use the Jaccard Index to implement a similarity score between files. However, the Jaccard Index and other technologies require all features from a file to have equal weight. Various embodiments of the present disclosure improve these existing technologies by improving the prediction accuracy and error rate, as described herein, for example, with regard to experimental results. Embodiments also improve these technologies because they learn certain key features that are the most important for detecting whether content is malicious or belongs to a particular malicious code or file family and weights them accordingly. Some embodiments also improve the functioning of the computer itself by reducing computing resource consumption, such as memory, CPU, and the like.

BRIEF DESCRIPTION OF THE DRAWINGS

The present invention is described in detail below with reference to the attached drawing figures, wherein:

FIG. 9 is an example table illustrating a pair count breakdown per family, in accordance with some embodiments;

DETAILED DESCRIPTION

Figure 1:
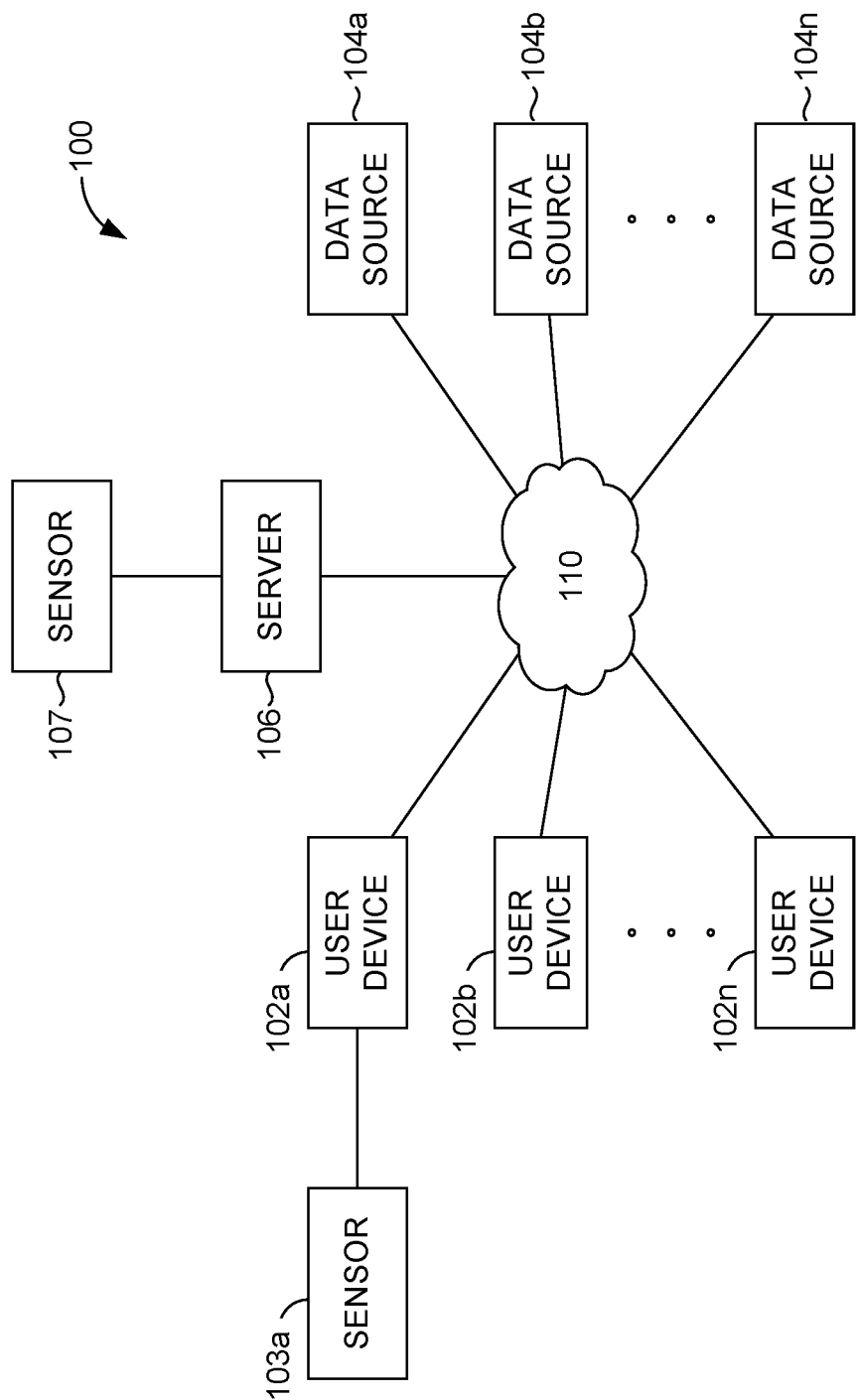
FIG. 1 is a block diagram of an example system, in accordance with some embodiments.

The subject matter of aspects of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described. Each method described herein may comprise a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a stand-alone application, a service or hosted service (stand-alone or in combination with another hosted service), or a plug-in to another product, to name a few.

As used herein, the term "set" may be employed to refer to an ordered (i.e., sequential) or an unordered (i.e., non-sequential) collection of objects (or elements), such as but not limited to data elements (e.g., events, clusters of events, and the like). A set may include N elements, where N is any non-negative integer that is 1 or greater. That is, a set may include 1, 2, 3, . . . N objects and/or elements, where N is an positive integer with no upper bound. A set may include only a single element. In other embodiments, a set may include a number of elements that is significantly greater than one, two, or three elements. As used herein, the term "subset," is a set that is included in another set. A subset may be, but is not required to be, a proper or strict subset of the other set that the subset is included in. That is, if set B is a subset of set A, then in some embodiments, set B is a proper or strict subset of set A. In other embodiments, set B is a subset of set A, but not a proper or a strict subset of set A.

Various embodiments described herein enable the detection of malicious content or malicious computer objects. "Content" or "computer object" as described herein is any suitable unit of information, such as a file, a set of code/instructions, one or more messages, one or more database records, and/or one or more data structures, or certain behavior or functionality that the content or computer object performs or is associated with. "Malicious" content or malicious computer objects may refer to malicious code/instructions, malicious files, malicious behavior (e.g., a particular timestamp malicious code is known to inject code or known to be inactive before it initiates activity), messages, database records, data structures, and/or any other suitable functionality that damages, harms, has undesirable effects, and/or causes unauthorized access to computing systems. Although various examples are described herein in terms of files, it is understood that this is representative only and that any computer object or content can be used instead of a file. It is understood that the term "content" and "computer object" can be used interchangeably when described herein. Some embodiments perform the detection by determining a similarity score (i.e., a measure of similarity) between known malicious content (or malicious indications) and unknown content (or unknown indications) based on feature weighting. An "indication" as described herein refers to any identifier or set of data that represents content. For example, an indication may be a vector, file hash, file signatures, or code that represents malicious content.

A "feature" as described herein represents a particular attribute or attribute value of content. For example, a first feature can be the length and format of a file, a second feature can be a particular URL of a file, a fourth feature can be operation characteristics, such as writing as short blocks, and a fifth feature can be a registry key pattern. A "weight" in various instances represents the importance or significant of a feature or feature value for classification or prediction. For example, each feature may be associated with an integer or other real number where the higher the real number, the more significant the feature is for prediction or classification. In some embodiments, a weight in a neural network or other machine learning application can represent the strength of a connection between nodes or neurons from one layer (an input) to the next layer (an output). A weight of 0 may mean that the input will not change the output, whereas a weight higher than 0 changes the output. The higher the value of the input or the closer the value is to 1, the more the output will change or increase. Likewise, there can be negative weights. Negative weights proportionately reduce the value of the output. For instance, the more the value of the input increases, the more the value of the output decreases. Negative weights may contribute to negative scores, which are described in more detail below. In many instances, only a selected set of features are primarily responsible for a determination of whether content belongs to a particular malicious family and is therefore malicious.

Various embodiments learn key features of content and responsively weight them during training. For example, some embodiments learn an embedding vector based on deep learning to detect similar computer objects or indications in feature space using distance measures, such as cosine distance. In these embodiments, each computer object is converted from string or other form into a vector (e.g., a set of real numbers) where each value or set of values represents the individual features of the computer object or indication in feature space. Feature space (or vector space) is a collection of vectors (e.g., each representing malicious or benign files) that are each oriented or embedded in space based on the similarity of features of the vector. Over various training stages, certain feature characteristics for each labeled computer object or indication can be learned. For example, for a first malware family (e.g., a certain category or type of malware), the most prominent feature may be a particular URL, whereas other features change considerably for different iterations of the first malware family. Consequently, the particular URL can be weighted to determine a particular output classification. In this way, embodiments learn weights corresponding to different features such that important features found in similar malicious content and from the same family contribute positively to the similarity score and features that distinguish malicious content from benign content (not malicious) contribute negatively to the similarity score.

In some embodiments, unique deep learning models, such as variations of a Siamese Neural Network (SNN) or variations of a Deep Structured Semantic Model (DSSM) can be used to detect unknown malicious content. Embodiments train a model that learns to give different weights to features based on their importance. Some deep learning model embodiments include two or more identical sub networks or branches, meaning that the sub networks have the same configuration with the same or tied parameters and weights. Each sub network receives distinct inputs (e.g., two different files) but are joined by an energy function at the top of the two identical sub networks, which determine how similar the two inputs are. Weight tying guarantees or raises the probability that two extremely similar sets of malicious content or indications could not possibly be mapped by their respective identical networks to very different locations in feature space because each network computes the same function. In this way, deep learning model embodiments can be useful for taking unknown content or indications and mapping them in feature space to determine a distance or similarity to known sets of malicious content or indications based on the particular features of the unknown file and the trained weights associated with the features of known files or indications.

Existing technologies have various functionality shortcomings leading to lower prediction accuracy and higher error rate, among other things. A key component of some malware detection technologies is determining similar content in a high-dimensional input space. For example, instance-based malware classifiers such as the K-Nearest Neighbor (KNN) classifier rely on the similarity score or distance between two files. The K-Nearest Neighbor classifier may be an optimal classifier in certain situations given an infinite amount of training data. Malware clustering, which identifies groups of malicious content may also rely on computing a similarity score between sets of content. A large portion of existing technologies use the Jaccard Index as the similarity score. For instance, some technologies create behavior profiles from execution traces. A locality sensitive hashing scheme is used to reduce the number of pairs that are considered. Malware files are grouped by hierarchical clustering where the Jaccard Index is used as the similarity metric. Other technologies, such as BITSHRED, employ feature hashing, bit vectors, and a MapReduce implementation on Hadoop to speed up the computation and reduce the memory consumption compared to previously proposed systems on a single CPU. BITSHRED also uses the Jaccard Index as the similarity measure for its co-clustering algorithm. Other technologies compare the Jaccard Index between the behavior files generated by multiple instances of analysis of a single file in multiple Anubis sandboxes to detect similar malware. However, one problem (among others) with these technologies is that the Jaccard Index requires all features from a file to have equal weight. As described above, certain key features (e.g., a particular URL or registry key) or patterns may be the most important for detecting whether individual content is associated with malware or likely belong to highly prevalent families or other malicious content families. Existing technologies are thus unable to dynamically learn key features to give them higher weight for prediction. Consequently, prediction accuracy is lower and error rates are relatively high.

Various embodiments of the present disclosure improve these existing technologies via new functionalities that these existing technologies or computer security systems do not now employ. These new functionalities improve prediction accuracy and reduce error rates, as described herein with regard to experimental results. This improvement occurs because some embodiments do things that computer security systems have not done before, such as learn certain key features that are the most important for detecting whether content contains malware or belongs to a particular malware family and weighting them accordingly. Accordingly, embodiments perform new functionality that learns weights corresponding to different features such that important features found in similar content, from the same family, have a high similarity score, whereas other features that distinguish malware content from benign content have lower similarity scores. New functionality includes learning, via a deep learning system, a feature space embedding for particular known malware families (and/or benign files) such that any new or unknown content indications can be mapped in the same feature space embedding to determine the specific distance or similarity between the new or unknown indications and the particular known malware family indications so that malicious content may be detected and/or the new or unknown content can be grouped or mapped to a particular family of malicious content.

Existing technologies also consume an unnecessary amount of computing resources, such as memory and CPU. For instance, existing technologies may require training with millions of files to detect malicious content in order to have acceptable prediction results. This storing of millions of files not only consumes a lot of memory, but CPU utilization is high because prediction data points may be compared to each trained file. This may cause bottlenecks in fetch, decode, or execute operations or otherwise affect throughput or network latency, among other things. Some technologies also only store malware signatures or other strings representing malicious content, which can consume an unnecessary amount of memory, especially when thousands or millions of files are stored.

Particular embodiments improve the functioning of a computer itself and improve other technologies because they do not consume an unnecessary amount of computing resources. For instance, some embodiments use deep learning models that share or tie weights or other parameters for two or more inputs. This means that there are fewer parameters to train on, which means less data is required and there is a less tendency to overfit. Consequently, less memory is consumed and there is less utilization of CPU because there is less data to compare prediction data points to. Accordingly, embodiments can improve metrics such as throughput and network latency among other things. Moreover, some embodiments perform compression-like functionality of data by converting strings and other content to vectors and doing computations (e.g., similarity scores based on cosine distance) on vectors in memory, as opposed to strings or malware signatures, which consume a relatively larger amount of memory compared to vectors. Therefore, embodiments save on computing resource utilization, such as CPU and memory.

Turning now to FIG. 1, a block diagram is provided showing an example operating environment 100 in which some embodiments of the present disclosure may be employed. It should be understood that this and other arrangements described herein are set forth only as examples. Other arrangements and elements (e.g., machines, interfaces, functions, orders, and groupings of functions) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by an entity may be carried out by hardware, firmware, and/or software. For instance, some functions may be carried out by a processor executing instructions stored in memory.

Among other components not shown, example operating environment 100 includes a number of user devices, such as user devices 102a and 102b through 102n; a number of data sources (e.g., databases or other data stores), such as data sources 104a and 104b through 104n; server 106; sensors 103a and 107; and network 110. It should be understood that environment 100 shown in FIG. 1 is an example of one suitable operating environment. Each of the components shown in FIG. 1 may be implemented via any type of computing device, such as computing device 800 as described in connection to FIG. 8, for example. These components may communicate with each other via network 110, which may include, without limitation, a local area network (LAN) and/or a wide area network (WAN). In exemplary implementations, network 110 comprises the Internet and/or a cellular network, amongst any of a variety of possible public and/or private networks.

It should be understood that any number of user devices, servers, and data sources may be employed within operating environment 100 within the scope of the present disclosure. Each may comprise a single device or multiple devices cooperating in a distributed environment. For instance, server 106 may be provided via multiple devices arranged in a distributed environment that collectively provide the functionality described herein. Additionally, other components not shown may also be included within the distributed environment.

User devices 102a and 102b through 102n can be client devices on the client-side of operating environment 100, while server 106 can be on the server-side of operating environment 100. Server 106 can comprise server-side software designed to work in conjunction with client-side software on user devices 102a and 102b through 102n so as to implement any combination of the features and functionalities discussed in the present disclosure. This division of operating environment 100 is provided to illustrate one example of a suitable environment, and there is no requirement for each implementation that any combination of server 106 and user devices 102a and 102b through 102n remain as separate entities. In some embodiments, the one or more servers 106 represent one or more nodes in a cloud computing environment. Consistent with various embodiments, a cloud computing environment includes a network-based, distributed data processing system that provides one or more cloud computing services. Further, a cloud computing environment can include many computers, hundreds or thousands of them or more, disposed within one or more data centers and configured to share resources over the network 110.

In some embodiments, a user device 102a or server 106, alternatively or additionally, comprises one or more web servers and/or application servers to facilitate delivering web or online content to browsers installed on a user device 102b. Often the content may include static content and dynamic content. When a client application, such as a web browser, requests a website or web application via a URL or search term, the browser typically contacts a web server to request static content or the basic components of a website or web application (e.g., HTML pages, image files, video files, and the like). Application servers typically deliver any dynamic portions of web applications or business logic portions of web applications. Business logic can be described as functionality that manages communication between a user device and a data store (e.g., a database). Such functionality can include business rules or workflows (e.g., code that indicates conditional if/then statements, while statements, and the like to denote an order of processes).

User devices 102a and 102b through 102n may comprise any type of computing device capable of use by a user. For example, in one embodiment, user devices 102a through 102n may be the type of computing device described in relation to FIG. 8 herein. By way of example and not limitation, a user device may be embodied as a personal computer (PC), a laptop computer, a mobile or mobile device, a smartphone, a tablet computer, a smart watch, a wearable computer, a personal digital assistant (PDA), a music player or an MP3 player, a global positioning system (GPS) or device, a video player, a handheld communications device, a gaming device or system, an entertainment system, a vehicle computer system, an embedded system controller, a camera, a remote control, a bar code scanner, a computerized measuring device, an appliance, a consumer electronic device, a workstation, or any combination of these delineated devices, or any other suitable computer device.

In some embodiments, a user device 102a and/or server 106 may include any of the components or (e.g., as described with respect to FIG. 2, 3, or 4) any other functionality described herein. For example, the user device 102 may detect malicious content, as described in FIG. 2. In some embodiments, the server 106 may help detect malicious behavior such that the user device 102a and server 106 are used in combination to detect malicious code. For example, a web application may be opened on the user device 102a. As a background task, or based on an explicit request from the user device 102a, the user device 102a may engage in a communication session or otherwise contact server 106, at which point the server 106 uses one or more models to detect malicious behavior and the like, such as described with respect to FIG. 2.

Data sources 104a and 104b through 104n may comprise data sources and/or data systems, which are configured to make data available to any of the various constituents of operating environment 100 or system 200 described in connection to FIG. 2. Examples of data source(s) 104a through 104n may be one or more of a database, a file, data structure, or other data store. Data sources 104a and 104b through 104n may be discrete from user devices 102a and 102b through 102n and server 106 or may be incorporated and/or integrated into at least one of those components. In one embodiment, data sources 104a through 104n comprise sensors (such as sensors 103a and 107), which may be integrated into or associated with the user device(s) 102a, 102b, or 102n or server 106.

Figure 2:
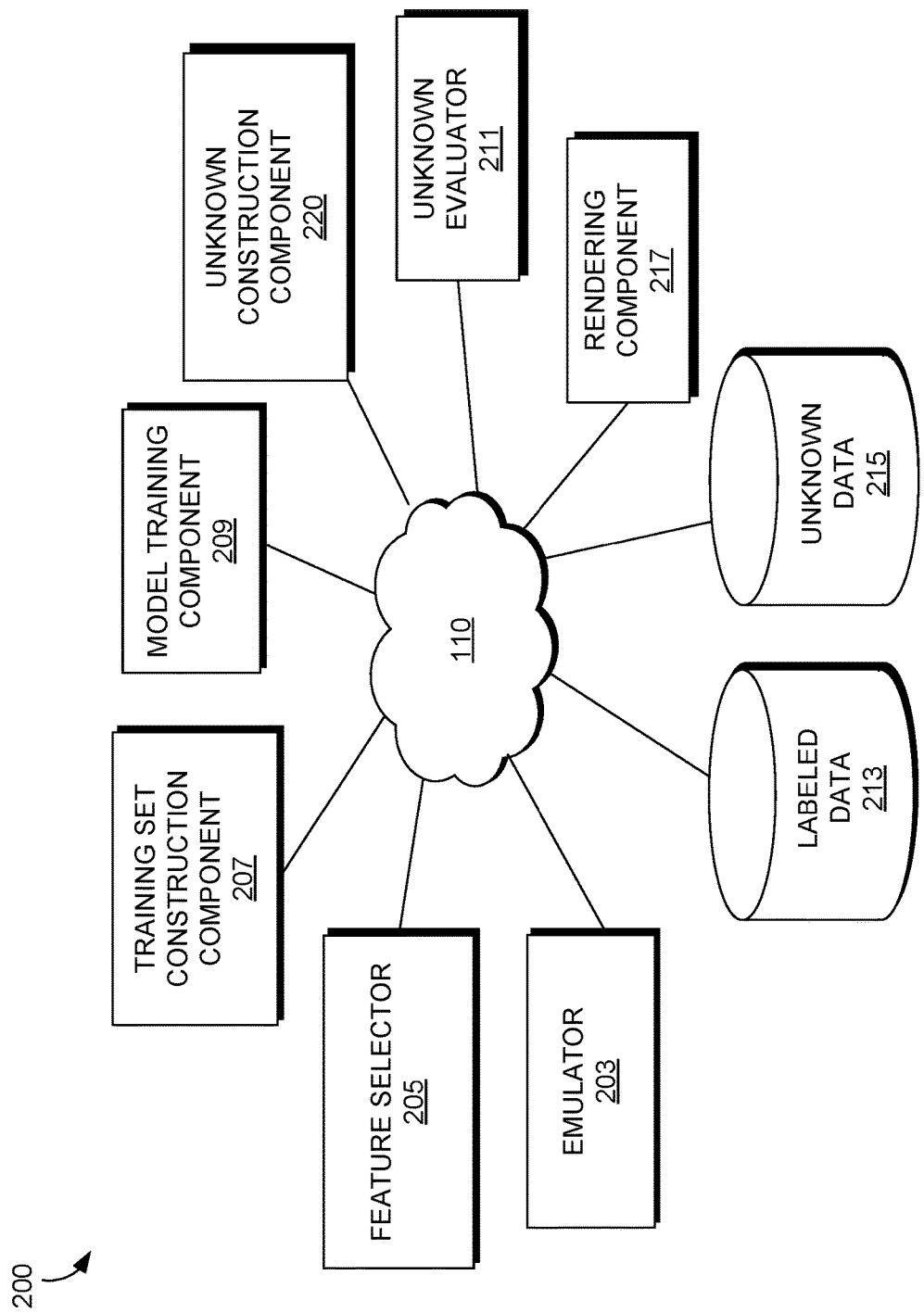
FIG. 2 is a block diagram of an example computing system architecture, in accordance with some embodiments.

Operating environment 100 can be utilized to implement one or more of the components of the system 200, described in FIG. 2. Operating environment 100 also can be utilized for implementing aspects of process flows 700 and 730 described in conjunction with FIGS. 7A and 7B, and any other functionality as described in FIGS. 2-13.

Referring now to FIG. 2, in conjunction with FIG. 1, a block diagram is provided showing aspects of an example computing system architecture suitable for implementing an embodiment of the disclosure and designated generally as the system 200. Generally, embodiments of system 200 enable or support detecting malicious content (e.g., code, functionality, features, etc.) and/or mapping malicious content to one or more families (e.g., types, categories, or titles). System 200 is not intended to be limiting and represents only one example of a suitable computing system architecture. Other arrangements and elements can be used in addition to or instead of those shown, and some elements may be omitted altogether for the sake of clarity. Further, as with operating environment 100 of FIG. 1, many of the elements described herein are functional entities that may be implemented as discrete or distributed components or in conjunction with other components, and in any suitable combination and location. For instance, the functionality of system 200 may be provided via a software as a service (SAAS) model, e.g., a cloud and/or web-based service. In other embodiments, the functionalities of system 200 may be implemented via a client/server architecture.

Emulator 203 is generally responsible for running or simulating content (e.g., applications, code, files, or other objects) in the labeled data 213 and/or unknown data 215 and extracting raw information from the labeled data 213 and/or the unknown data 215. The labeled data 213 includes files or other object samples that are tagged or indicated with labels or classifications for training in a machine learning system. For instance the labeled data 213 can include multiple files where the files have been tagged according to particular malicious code or file families (and/or sub-families) and/or labeled benign (or families/sub-families) of benign files. For example, the labeled data 213 can include several iterations or sub-families (the sub-family is the label) of files that have been infected with Rootkit malware, as well as other families of malicious code. In this way, a machine learning model can be trained to identify patterns or associations indicated in the labeled data 213 for prediction purposes, as described in more detail herein. The unknown data 215 includes files or other content for which there is no predetermined label or classification. For example, the unknown data 215 can be any incoming file (e.g., a test file) that is analyzed after a machine learning model has been deployed, or trained or tested using the labeled data 213.

The labeled data 213 and unknown data 215 may generally be represented as storage. Storage generally stores information including data, computer instructions (e.g., software program instructions, routines, or services), content, data structures, training data, and/or models (e.g., machine learning models) used in embodiments of the technologies described herein. By way of example and not limitation, data included in the labeled data 213 and unknown data 215 may generally be referred to throughout as data. Some embodiments store computer logic (not shown) comprising the rules, conditions, associations, classification models, and other criteria to execute the functionality of any of the components, modules, analyzers, generators, and/or engines of systems 200.

In some embodiments, the emulator 203 (or any component described herein) runs in a virtualized (e.g., a virtual machine or container) or sandboxed environment. In this way, any malicious content that are running may not infect a host or other applications. In some embodiments, particular raw information is extracted from the labeled data 213 and/or the unknown data 215. For instance, the raw information may be unpacked file strings (or strings where function calls are made to unpack file strings) and API calls with their associated parameters. This is because malicious content is often packed, compressed, or encrypted, and so calls to decrypt or otherwise unpack the data may be desirable. Regarding API calls, certain malicious content may have a specific API call pattern so this information may also be desirable to extract.

The feature selector 205 is generally responsible for selecting particular features of the labeled data 213 and/or the unknown data 215 (e.g., selected features of the information extracted by the emulator 203) for training, testing, and/or making a prediction. In various instances there may be hundreds or thousands of features in the raw data generated by the emulator 203. It may be computationally resource intensive to train a model using all of these features so a selected set of features may be used for training, testing, or prediction. Features can be selected according to any suitable technique. For example, features can be selected based on features that yield the most discriminative features using mutual information criteria. That is, A (t, c) is computed as the expected "mutual information (MI) of term t and class c. MI measures how much information the presence/absence of a term contributes to making the correct classification decision on c. Formally:

$$(U; C) = \Sigma_{e_t \in \{1,0\}} \Sigma_{e_c \in \{1,0\}} P(U = e_t, C = e_c) \log_2 \frac{P(U = e_t, C = e_c)}{P(U = e_t) \, P(C = e_c)},$$ Equation 1 where U is a random variable that takes values $e_{t=1}$ (the document contains term t) and $e_{t=0}$ (the document does not contain t), and C is a random variable that takes values $e_{c=1}$ (the document is in class c) and $e_{c=1}$ (the document is not in class c). $U_t$ and $U_c$ are written if it is not clear from context to which term t and class c are referring. For MLEs of the probabilities, equation 1 is equivalent to:

$$(U; C) = \frac{N_{11}}{N} \log_2 \frac{N N_{11}}{N_{1.} N_{.1}} + \frac{N_{01}}{N} \log_2 \frac{N N_{01}}{N_{0.} N_{.1}} + \frac{N_{10}}{N} \log_2 \frac{N N_{10}}{N_{1.} N_{.0}} + \frac{N_{00}}{N} \log_2 \frac{N N_{00}}{N_{0.} N_{.0}}$$ Equation 2 where the Ns are counts of documents that have the values of $e_t$ that are indicated by the two subscripts. For example, $N_{10}$ is the number of documents that contain $t(e_t=1)$ and are not in $c(e_c=0)$. $N_1 = N_{10} + N_{11}$ is the number of documents that contain $t(e_t=1)$ and documents independent of class membership are counted ($e_c \in \{0,1\}$). $N = N_{00} + N_{01} + N_{10} + N_{11}$ is the total number of documents.

The training and/or test set construction component 207 is generally responsible for selecting malicious content known to be similar (e.g., content from the same families/sub-families) and/or selecting benign content, which may be dissimilar in preparation for training and/or testing. In some embodiments, the training and/or test set construction component 207 receives user indications to make these selections. In some embodiments, the training and/or test set construction component 207 generates a unique identifier (e.g., a signature ID) for each set of content in the labeled data 213, and then embodiments can responsively group or select similar malicious content pairs belonging to the same malicious family. For example, from the family of viruses, the sub-families of two boot sector viruses can be paired together in preparation for training.

The model training component 209 is generally responsible for training a machine learning model by using the data selected via the training set construction component 207 and/or the other components. In some embodiments, the model training component 209 additionally converts the selected features made by the feature selector 205 into vectors in preparation for training and orienting them in feature space. In some embodiments, weights are adapted during training based on the cosine or other distance between embeddings of known malicious content and other known malicious content and/or benign content. For example, over several stages of training, it can be determined that a set of vectors representing malicious files are within a threshold distance of each other. Back propagation and other techniques can be used to compute the gradient of the loss function for the weights to fine-tune the weights based on error rate in a previous training stage. In this way, particular features deemed to be more important for particular malicious content may be learned.

The unknown construction component 220 is generally responsible for selecting malicious content known to be similar (e.g., content from the same families/sub-families) and/or selecting benign content and pairing them together or pairing them with known malicious content for testing or prediction after model deployment. For example, from the family of viruses, the sub-family of a boot sector virus can be paired together with the new incoming file for prediction.

The unknown evaluator 211 is generally responsible for determining which malicious sets of content (within the labeled data 213) are similar to unknown sets of content (i.e., it is not known whether the unknown sets contain malicious content) (within the unknown data 215) and scoring similarity accordingly. For example, features can be extracted from an incoming malware file or code after model deployment. The malware file/code or features can then be converted to a vector and oriented in feature space. A distance can then be computed between each vector representing the labeled data 213 and the incoming malware file or code, which is indicative of a similarity score. If the similarity score exceeds a particular threshold (the vectors are within a threshold distance), the incoming file or code can be automatically be mapped to the particular family or sub-family of malicious contents. This is because the model training component 209 has presumably trained and/or tested a model to reflect the importance of certain features for a given malware file or object, which means that trained vectors are oriented in vector space based on the correct weights. Accordingly, if the vector representing the incoming file or code is close within a distance (e.g., a cosine distance), this may mean that the incoming file or code for which it is unknown to contain malicious content has the same or similar features compared to the labeled malicious file or code or its family members.

The rendering component 217 is generally responsible for presenting indications of whether malicious content have been detected based on similarity scores determined by the unknown evaluator 211. In some embodiments, the rendering component 217 generates a user interface or report, which indicates whether a particular set of content (e.g., the unknown data 215) is likely malicious. In some embodiments, the user interface or report additionally indicates each family (as assigned in the labeled data 213) (or certain families that are within a distance threshold) and a confidence score or likelihood that the particular set of content belongs to the family. For example, a user interface may return a ranked list of items (e.g., indications of files in a telemetry report) that have a similarity score above a threshold compared to the particular file (e.g., the unknown data 215). In some embodiments, the rendering component 217 generates a new file or otherwise generates structured data (e.g., via tagging, inputting in column or rows or fields) (e.g., that is storable) to indicate various analyses regarding whether a particular piece of content is likely malicious and/or belongs to a particular family of malicious content. Such new file, for example, can be an attachment report of findings, for example.

Figure 3:
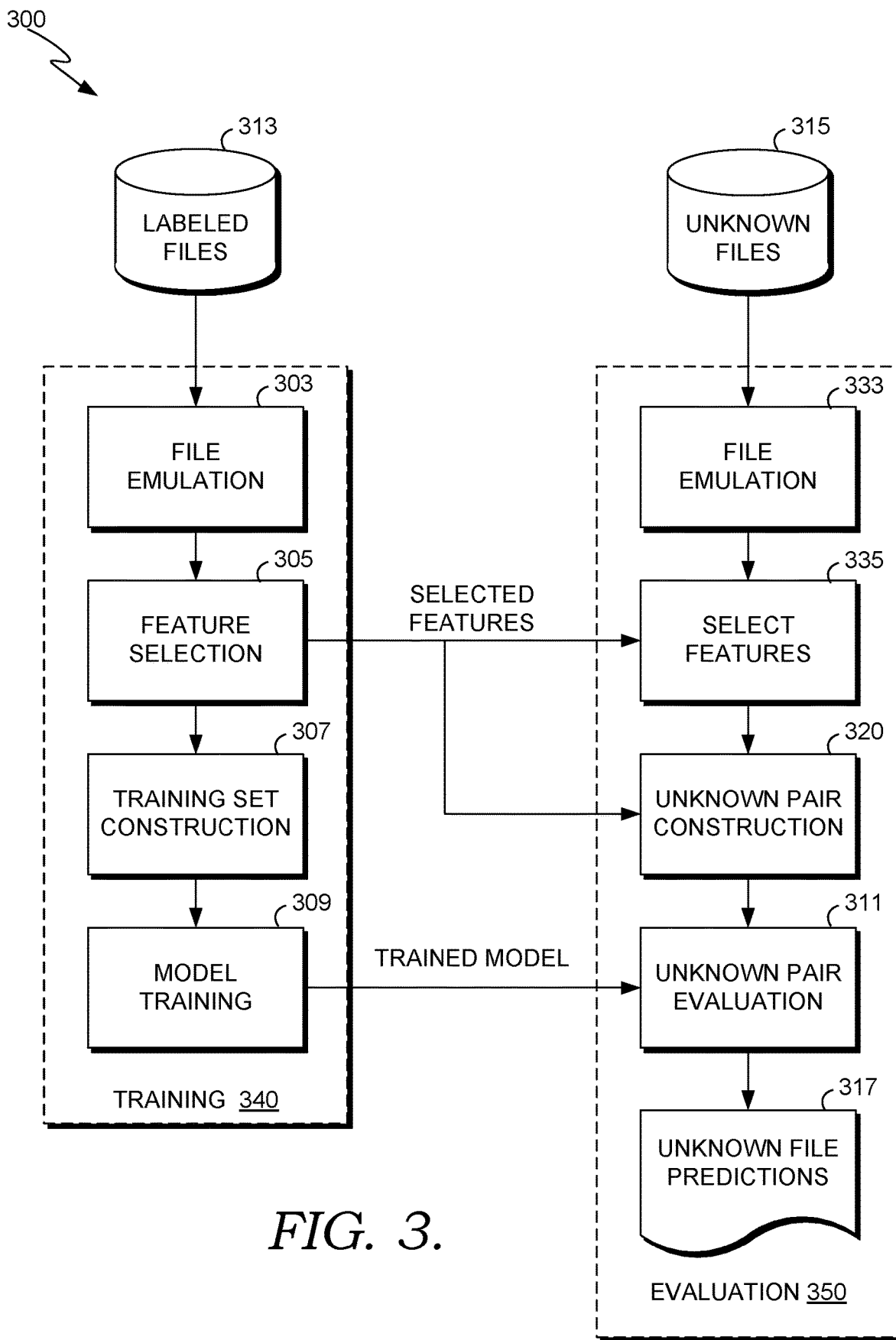
FIG. 3 is a block diagram of system for training a machine learning model on various malware content and predicting whether one or more particular sets of unknown content contain malware, in accordance with some embodiments.

FIG. 3 is a block diagram of system 300 for training a machine learning model on various malware content and predicting whether one or more particular unknown files (files for which its malicious nature is unknown) contain malware, particularly with respect to highly prevalent malware families. The system 300 includes the training component 340 and the evaluation component 350. The training component 340 illustrates the functionality used to train the underlying model, while the evaluation component 350 illustrates the steps followed when evaluating a set of unknown files in order to automatically predict if they belong to one of the highly prevalent malware families.

In some embodiments, file emulation 303 represents functionality performed by the emulator 203 of FIG. 2. In some embodiments, the first component for model training and known file evaluation is lightweight file emulation 303. In some embodiments, file emulation 303 is performed using a modified version of a production anti-malware engine. This anti-malware engine extracts raw, high-level data during emulation and generates the logs. These logs can be consumed by the downstream processing (e.g., the other components within the training component 340). Embodiments utilize dynamic analysis to extract raw data from the labeled files 313 for training the model and from the unknown files 315 for predicting the family (or predicting what family/sub-family a particular file belongs to based on its vector representation).

Some embodiments of file emulation 303 employ two types of data extracted from the files, including unpacked file strings and Application Program Interface (API) calls with their associated parameters. Malware and other malicious code/files are often packed or encrypted. As the file emulation 303 functionality emulates by an anti-malware engine, the malware unpacks or decrypts itself and often writes null-terminated objects to the emulator's memory. Typically, these null-terminated objects are the strings which have been recovered during unpacking or decryption, and these strings may provide a good indication of whether or not the file is malicious.

In some embodiments, in addition or alternative to the unpacked file strings, a second set of high-level features are constructed from a sequence of API calls and their parameter values via file emulation 303. The API stream is composed of function calls from different sources including the user mode operating system and the kernel mode operating system. For example, there are a particular quantity of WINDOWS APIs that can be used to read a registry key value including the user mode functions RegQueryValue( ) and RegQueryValueEx( ) and the RtlQueryRegistryValues( ) function from kernel mode. In some embodiments, functions which perform the same logical operation are mapped to a single API event. In these embodiments, calls to RegQueryValue( ) RegQueryValueEx( ) and RtlQueryRegistryValues( ) are all mapped to the same API event ID (EventID). Alternatively or additionally, important API parameter values, such as the key name or the key value, are also captured by file emulation 303. In some embodiments, using this data, the second feature set is constructed from a sequence of API call events and their parameter values. In some embodiments, to handle the case where several API calls are mapped to the same event but have different parameters, only the two (or other threshold quantity) most important parameters shared by the different API calls are considered.

In some embodiments, file emulation 303 includes low-level feature encoding. Each malware sample may generate thousands of raw unpacked file strings or API call events and their parameters. Because particular embodiments detect polymorphic malware (malware that consistently changes its identifiable features in order to evade detection) in addition to non-polymorphic malware, some embodiments do not encode potential features directly as sparse binary features (typically zero values that are binary). For instance, if each variant in a family drops or removes a second, temporary file with a partially random name or contacts a command and control (C&C) server with a partially random URL, in some embodiments, the file name or URL is not represented explicitly. Instead, some embodiments encode the raw unpacked file strings and the API calls and their parameters as a collection of N-Grams of characters. In some embodiments, trigrams (i.e., N-Grams where N=3) of characters for all values are used.

One limitation of a Jaccard Index-based similarity system (as described above), is that it cannot distinguish or determine importance between multiple types of features in the same set (e.g., EventID, parameter Value 1, parameter value 2). Also, short values such as the EventID (e.g., 98) have less influence on the Jaccard Index than longer features including the parameter values (e.g., the registry key name). To improve the performance of the Jaccard Index baseline system, some embodiments overcome these limitations by expanding the EventID to the full API and encoding the entire API name as a string using character-level trigrams (or other N-Gram configurations). Thus, representing the API name using their trigrams (or other N-Gram configurations) allows the API names to contribute more significantly to the file pair's Jaccard Index. In some embodiments, the trigram representation of the API name is used for all models to fairly compare the results of the SNN model with the Jaccard Index-based model, the results of which are described in more detail below.

Particular embodiments described herein do not suffer from these limitations that Jaccard Index-based models suffer from. Some embodiments of the file emulation 303 encode the event ID or the API name as a single categorical feature because certain deep learning networks, such as two-deep neural networks, can learn to assign larger weights to the most important API calls for pairs of similar files. Thus, the entire call can be encoded separately as (EventID, parameter 1 N-Grams, Parameter 2 N-Grams). This improves a learning model's performance (including SNN models or DSSM) since it learns a specific representation for each combination of EventID and the N-Grams of the parameter values.

In some embodiments, feature selection 305 includes the functionality performed by the feature selector 205. In various instances there may be hundreds of thousands of potential N-Gram features in the raw data generated during dynamic analysis, and it may be computationally prohibitive to train a model using all of them. Accordingly, feature selection may be performed per class, which may yield the most discriminative features using, for example, mutual information criteria, as described above. In order to process a production-level input data stream, embodiments implement functions, which may be needed to preprocess big data, such as in MICROSOFT's COSMOS MapReduce system, for example.

In some embodiments, the training set construction 307 is functionality performed by the training set construction component 207 of FIG. 2. In some embodiments, before training, embodiments of the training set construction 307 first construct a training set that includes the selected N-Gram features from pairs of malware files, which are known to be similar, as well as those from benign files, which are dissimilar (for labeling purposes, even though they may be in-fact similar). Embodiments determine the similar malware file or other content pairs for the training set based on several criteria. For example, in order to correctly train the model, similar file pairs are first carefully chosen. Randomly selecting two files whose families match, may not work well in practice. The problem is that there may be many different variants of some of these families. To solve this problem, a malware file's detection signature can be utilized. An anti-malware engine may utilize specific signatures to determine if an unknown file or content is malicious or benign. Each signature is often very specific and has a unique identifier (SignatureID). Therefore, in some embodiments, the first step in determining similar pairs for training is to group pairs of malware files or content detected with identical SignatureIDs. While most malicious files or other content that are detected with the same SignatureID belong to the same malware family, this is not always the case, which is why further analysis may need to be done to map or label the unique identifiers to the correct family. This may be a problem with existing technologies that simply detect whether a file is malicious or not based mainly or solely on the SignatureID of malware. Accordingly, some embodiments improve these technologies by labeling a candidate file or other content pairs as belonging to the same family.

Various embodiments of the training set construction 307 construct pairs of malware files based on the Signature ID and/or the malware family. In certain embodiments, benign files all belong to one class or label and are not assigned a SignatureID since they are not malicious. As a result, similar pairs for benign files are not constructed in particular embodiments. Consequently, to overcome this, some embodiments also construct a "dissimilar" pair constructed by randomly selecting a unique malware file and benign file to form the pair. The format of this training set is illustrated in the following table 1, according to some embodiments:

TABLE 1

Training and test set instance format.
Field

Training Set ID
Label (similar 1 dissimilar)
Malware 1 N-Gram Features
Similar Malware 2 or Benign File N-Gram Features The Training Set ID is constructed from the concatenation of the SHA1 file hashes for Malware 1 ($M_1$), and either Malware 2 ($M_2$) or a Benign File (B) (i.e., $SHA1_{M_1}$-$SHA1_{M2, B}$). This ID allows embodiments to identify which files were used to construct the training instance. The next filed in the training set provides the label where 1 indicates that the two files are similar (M1, M2) and −1 indicates that they are dissimilar (M1, B). The third field provides the selected N-Gram features from the primary malware file $M_1$. The N-Grams from the matching malware file $M_2$ or the randomly selected benign file (B) are provided in the final field.

For the hold out test set used for evaluating all models, as described in more detail below, embodiments of the training set construction 307 ensure that the file pairs in the training and test sets are unique or different. To do so, a first set of malware files may be randomly selected for the training and test sets followed by a pair of files (e.g., of the first set) that include a malware file and a benign file. Responsively, a second similar malware file pair is selected. If either of the files in the second pair match one of the files in the first set, this second malware pair is added to the training set. If it is not in the training set, embodiments add it to the test set.

Similarly, in some embodiments, this same process can be done for a second dissimilar malware and benign pair such that the second dissimilar malware and benign pair are compared against the first set. Particular embodiments continue to do this procedure of randomly selecting malware pairs and adding them to training or test sets until each is complete.

In some embodiments, the model training 309 includes functionality performed by the model training component 209 of FIG. 2. In some embodiments, after the training set has been constructed via the training set construction 307, a model (e.g., an SNN) is trained, as depicted, for example with respect to FIG. 5 or FIG. 6. In some embodiments, the weights are adapted during training based on the cosine distance between the vector embedding of the known malware files, $M_1$, on the left-hand side (as analyzed by the training component 340) and the vector embedding of the malicious or benign files on the right-hand side (as analyzed by the evaluation component 350). The combined set of similar and dissimilar files may be denoted as $F \in \{M_2, B\}$. Some embodiments use backpropagation with stochastic gradient descent (SGD and the Adam optimizer) to train model parameters.

When testing files or other content, some embodiments input known malware files or content to the left-hand side (the training component 340), and new or unknown files or content (e.g., the testing files) are then evaluated using the right-hand side (evaluation component 350). The testing files or content may represent new or different files or content that a model has not yet trained on. Thus during testing, the model's output may represent the cosine distance between the embedding or vector of the known malware content for the left-hand side and the embedding or vector of the malicious or benign file on the right-hand side according to some embodiments. For example, a first set of files in the unknown files 315 may first be subject to file emulation 333 (which may be the same functionality performed by file emulation 303 and performed by the emulator 203), such that the first set of files are emulated and particular information is extracted, such as API calls and packed strings, which are then unpacked. Then features can be selected from the first set of files per 335 (e.g., via the same or similar functionality as described with respect to feature selection 305 or via the feature selector 205). Responsively, unknown pair construction 320 can be performed (e.g., via the same or similar functionality with respect to the training set construction 307 or via the unknown construction component 220) such that similar malicious test files are grouped together and any other benign test files are grouped together. This functionality may be the same functionality as the training set construction 307, except that the files are not training data, but test data to test the accuracy or performance of the model. Responsively, in some embodiments, unknown pair evaluation 311 is done for each file in the first set of files. This evaluation may be done using the model training 309 of the training component 340. For example, a first test file of the first set of files can be converted into a first vector and mapped in feature space, and a similarity score can be determined between the first vector and one or more other vectors represented in the labeled files 313 (i.e., other malware files represented as vectors) by determining the distances between the vectors in feature space. In various embodiments, an indication of the similarity score results is then output via the unknown file predictions 317. For example, any suitable structured format, user interface, file, etc. can be generated, as described with respect to the rendering component 217.

In some embodiments, the evaluation component 350 illustrates how files are evaluated or predicted after data has been trained and tested, or a model is otherwise deployed in a particular application. For example, after a model has been both trained and tested, a model can be deployed in a web application or other application. Accordingly, a user, for example, may upload a particular file (e.g., an unknown file 315) to a particular web application during a session in order to request prediction results as to whether the particular file is likely associated with malware or belongs to a particular malware family. Accordingly, all of the processes described with respect to the evaluation component 350 can be performed at runtime responsive to the request such that unknown file predictions 317 may indicate whether the file uploaded by the user is associated with malware. As illustrated in the system 300, such prediction can be based on the model training 309 (and/or testing) of other files.

The format for the evaluation set can be provided, as indicated in the table II below:

TABLE II

Evaluation set instance format.
Field

Evaluation Set ID
Label (similar 1 dissimilar)
Known Malware N-Gram Features
Unknown File N-Gram Features Similar to the Training Set ID, the Evaluation Set ID includes the SHA1 file hash of the known malware file and an unknown file (i.e., AH $A1_{M1}\_SHA1_U$) which allows a determination to be made concerning which malware file is similar to the unknown file. The other two fields include the N-Grams from the known malware file and the unknown file. In some embodiments, to evaluate the unknown files, the selected N-Gram features are first included from all of the known variants of highly prevalent families in the training set (e.g., the labeled files 313). In some embodiments, these features correspond to the left-hand side of the deep learning model of FIG. 4. Then the selected N-Gram features can be included from all of the unknown files that arrive for processing within a particular time period (e.g., a particular day, week, month, etc.).

Depending on the number of known variants of the prevalent families and the incoming rate of the unknown files, it may be desirable to further prefilter the number of file pairs to be considered. In some embodiments, this prefiltering includes employing a MinHash algorithm to reduce the quantity of pairs of files used during training or the number of file pairs included during evaluation. A locality sensitive hash algorithm may alternatively or additionally be used. The MinHash algorithm is approximately 0(n) and identifies only a small number of samples which need to be compared to each unknown file being evaluated.

In embodiments, subsequent to the known file pairs being constructed, they can be evaluated via the unknown pair evaluation 311. That is, the known file pairs can be evaluated and compared against the trained pairs using the model training 309. If the similarity score exceeds a prescribed threshold, then embodiments automatically determine that the file belongs to the same family (or sub-family) as the known malware file in the evaluation pair.

Some embodiments alternatively determine similarity scores or otherwise detect if an unknown file is malicious by replacing the cosine( ) distance with an optional K-Nearest Neighbor (KNN) classifier and assign the unknown file to the voted majority malware family or benign class of the K known files with the highest similarity score(s). Assigning the label of the single closest file (K=1) may perform well. Accordingly, some embodiments only need to find a single file (e.g., as stored to the labeled files 313) that is most similar to an unknown file (in the unknown files 315).

In some embodiments, in order to process a production-level input data stream, other functional blocks needed to preprocess data for training and testing (e.g., in MICROSOFT's COSMOS MapReduce system) are implemented. These functional blocks may include the feature selection and training set construction for training as well as the evaluation functions which select the features to create the unknown pair dataset. Once the datasets are constructed, a model can be trained and results for the evaluation or test set can be evaluated on a single computer in some embodiments. In practice, evaluating the prediction scores from the trained model for the set of unknown files and the K-Nearest Neighbor classifier would also be performed in platforms, such as the MapReduce platform.

Figure 4:
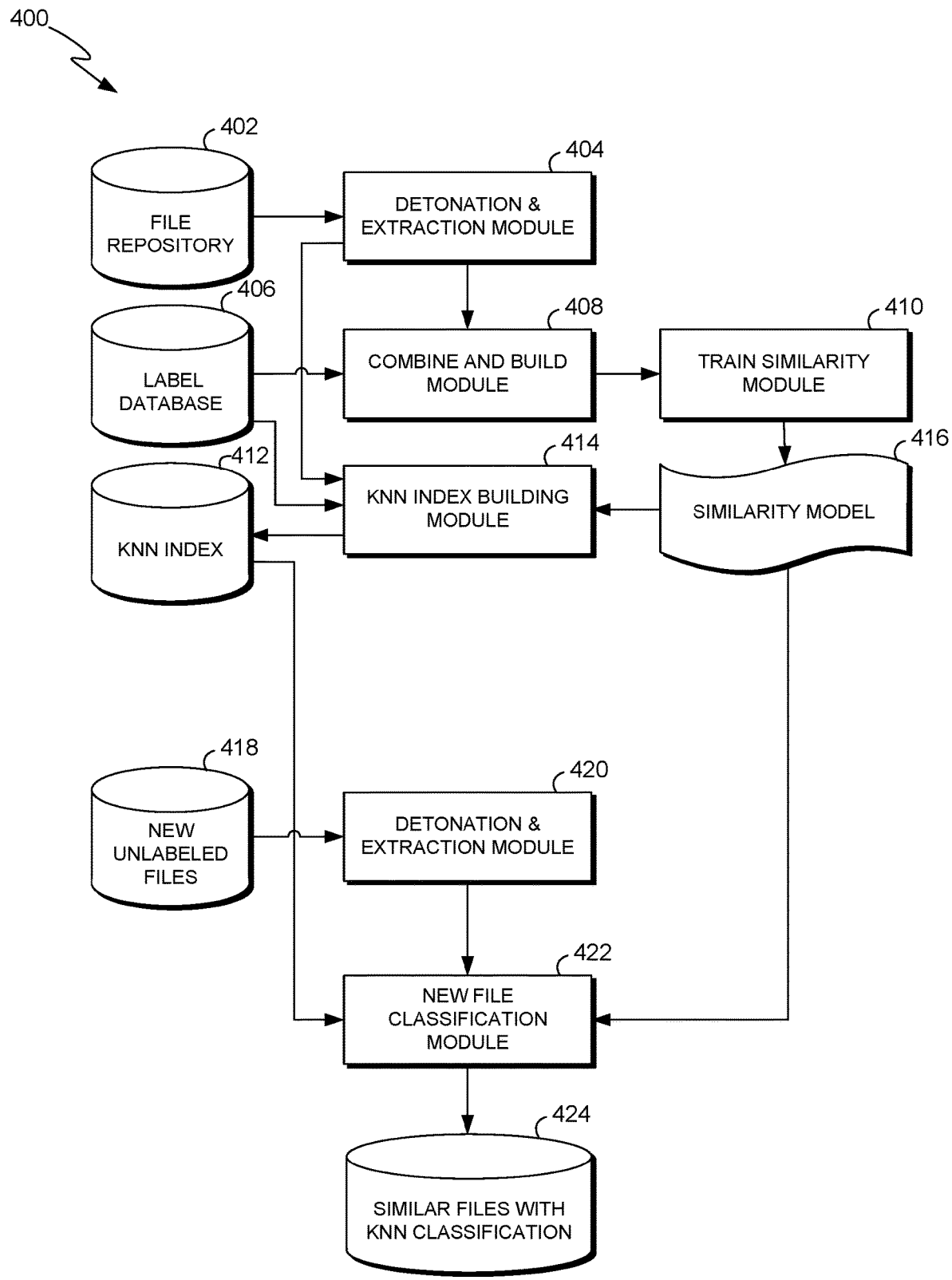
FIG. 4 is a block diagram of an example system for determining whether new content is malicious using a trained model, in accordance with some embodiments.

FIG. 4 is a block diagram of an example system 400 for determining whether new files are malicious using a trained model, according to some embodiments. The system 400 includes the file repository 402, the detonation and extraction module 404, the label database 406, the combine and build module 408, the train similarity module 410, the index data 412, the KNN index building module 414, the similarity model 416, the new unlabeled files 418, the detonation and extraction module 420, the new file classification module 422, and the similar files with KNN classification output 424. It is understood that any of the components of the system 400 can replace or be combined with any of the components as described in the systems of FIG. 2 and/or FIG. 3.

In some embodiments, the detonation and extraction module 404 first detonates and extracts strings and behavior features from the file repository 402. In some embodiments, the detonation and extraction module 404 includes the functionality described with respect to the emulator 203 of FIG. 2 and/or the file emulation 303 of FIG. 3. In an illustrative example, the detonation and extraction module may extract packed file strings (and then unpack them) and API calls with their associated parameters from the file repository 402. In various embodiments, the file repository represents a data store of files that are not yet labeled, such that it is unknown whether files are associated without malicious content.

In some embodiments, responsive to the detonation and extraction module 404 performing its functionality, the combine and build module 408 combines features with labels from the label database 406 and combines into a similarity training dataset where similar files are paired (with a label called "similar") and dissimilar files are paired (with a label called "dissimilar"). In some embodiments, the combine and build module 408 includes the functionality described with respect to the feature selector 205 and/or the training set construction component 207 of FIG. 2 and/or the feature selection 305 and/or the training set construction 307 of FIG. 3. In an illustrative example, a computing device can receive user selections of different members of the same family that are paired together for training and labeled "similar" and other members are combined with benign files or members of a different family and labeled "dissimilar."

In some embodiments, responsive to the functionality performed by the combine and build module 408, the train similarity module 410 trains a similarity metric using a machine learning architecture, such as an SNN or DSSM architecture, to produce a similarity model. In some embodiments, the train similarity module 410 includes the functionality as described with respect to the model training component 209 of FIG. 2 and/or the model training 309 of FIG. 3. In an illustrative example, the train similarity module 410 may take the pairs generated by the combine and build module 408, convert the pairs to vectors, and embed each pair in feature space, and over different stages of training, the weights of particular important features can be adjusted as described herein such that the final training output is each file represented as a vector in feature space that is embedded with as minimal loss as possible based on changing the weights over training iterations.

In some embodiments, responsive to the similarity model being trained, the KNN (K-Nearest Neighbor) index building module 414 receives the extracted strings and behavioral features generated by the detonation and extraction module 404 and further receives the labels from the label database 406 and further receives portions of the similarity model 416 to build out a KNN index 412. In various embodiments, the KNN index 412 is used to map or quickly index incoming or new files (e.g., after a model has been deployed) to training data so that appropriate classifications can be made.

In some embodiments, after the KNN index 412 is built, new unlabeled files 418 (which are not part of the label database 406) are tested and/or otherwise used to make a prediction, such as after model deployment. As illustrated in FIG. 4, the detonation and extraction module 420 processes new unlabeled files 418 by detonating and extracting string and behavior features. In some embodiments, the new unlabeled files 418 are new files that have not been analyzed for maliciousness that were previously located in the file repository 402. Alternatively, in some embodiments, the new unlabeled files 418 are brand new files that are not located in the file repository 402. In some embodiments, the detonation and extraction module 420 represents the same module as the detonation and extraction module 404. Alternatively, these may be separate modules. In some embodiments, the detonation and extraction module 420 includes the functionality as described with respect to the emulator 203 and/or the file emulation 333 of FIG. 3.

In some embodiments, responsive to the detonation and extraction module 420 performing its functionality, the new file classification module 422 classifies the new files in the new unlabeled files 418. In some embodiments, this may occur by looking up similar labeled files using the similarity model 416 and the KNN index 412 to product a set of similar files with KNN classification 424. In some embodiments, labels (or classification by the new file classification module 422) through majority vote determine the label or classification of the new unlabeled files 418.

Figure 5:
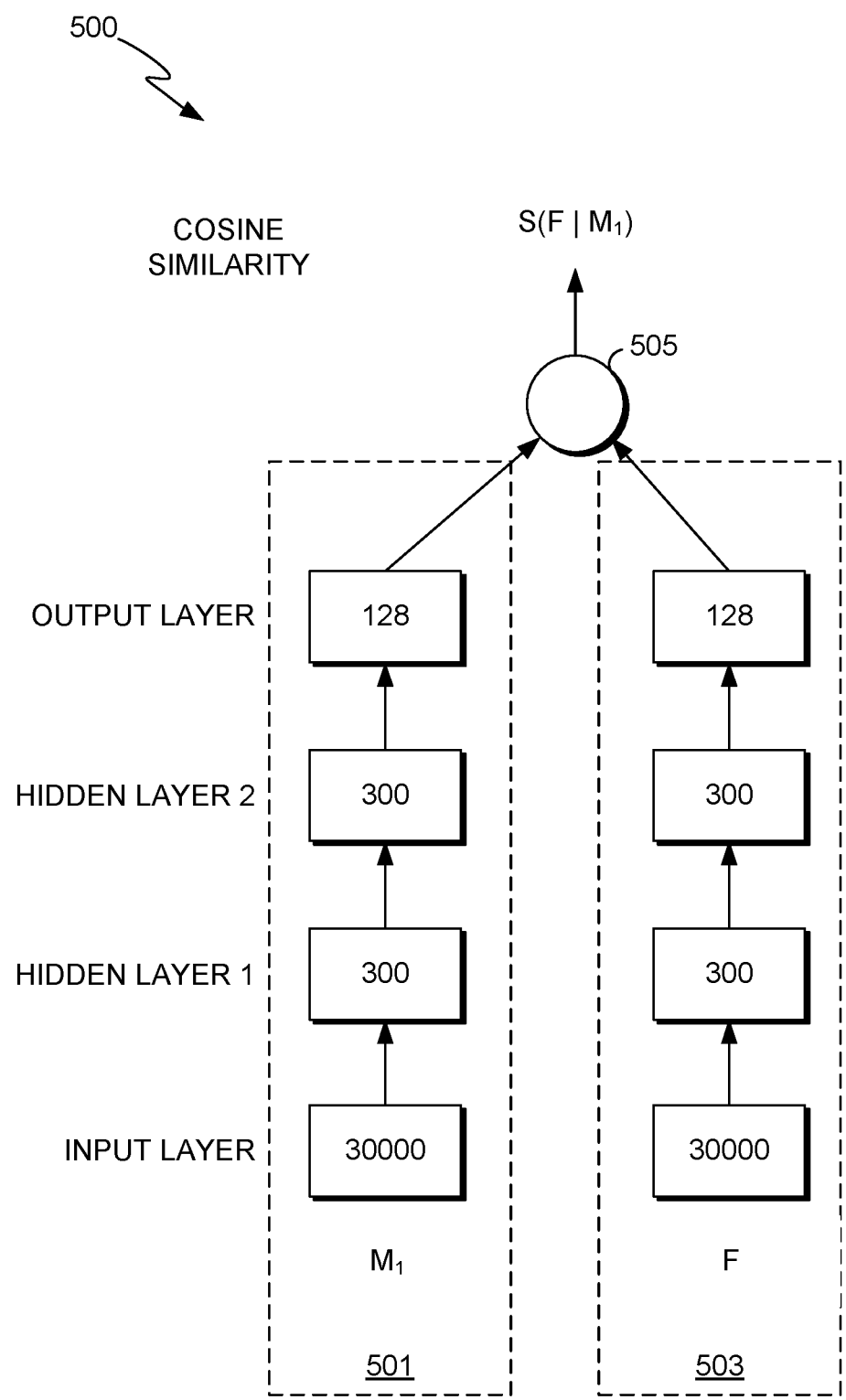
FIG. 5 is a schematic diagram of an example deep learning neural network (DNN) that is used by particular embodiments.

FIG. 5 is a schematic diagram of an example deep learning neural network (DNN) 500 that is used by particular embodiments of the present disclosure. In some embodiments, the deep learning neural network 500 represents the similarity model 416 of FIG. 4, or the model training 309 of FIG. 3. The deep learning neural network 500 includes the branches 501 and 503, which are distinct but identical sub-networks (as illustrated by the same parameter values, such as 30000, 300, 300, and 128). As illustrated in FIG. 5, each branch includes an input layer, two hidden layers, and an output layer. The branches 501 and 503 are joined at the top by a function 503 to determine similarity between two inputs (e.g., two contents, such as two files). It is understood that although there are only two branches 501 and 503 and a particular DNN configuration, and suitable quantity of branches or configurations may exist. Each layer can perform a linear transformation and/or squashing nonlinearity function compared to other layers. The DNN can effectively have an input layer that distributes weighted input to the first hidden layer, which transforms its input and sends it to the second hidden layer. The second hidden layer transforms output received from the first hidden layer and passes is to an output layer, which performs further transformation and produces an output classification or similarity score.

The DNN 500 in particular embodiments represents a two-deep neural network that is trained where the cosine similarity score is used to learn the parameters for both branches 501 and 503. In some embodiments, during training, the left branch 501 and the right branch 503 are trained with known similar and dissimilar pairs (e.g., representing the training component 340) of content. For example, during a first training stage, a first file is converted into a first vector and input at the input layer of the first branch 501 and a second similar file is converted into a second vector and input at the input layer of the second branch 503 and is fed through the layers (the hidden layer 1, hidden layer 2, output layer) such that the output layer learns a distance function between the two vectors. The cosine similarity between the two similarity sets of content are then computed via the function 505, such as an energy function. In some embodiments, the similarity score occurs as a result of combining both vectors representing the first content and the second content to a single vector by taking the element wise absolute difference ($|h(X_1)-h(X_2)|$) between the two vectors. In particular embodiments, the single vector is then put through a sigmoid function to output a similarity score between 0 and 1. This process may be repeated during the first training stage (or other training stages) for pairs of dissimilar sets of content (e.g., a malicious file and a benign file) such that the content sets are converted to respected vectors and combined to a single vector where a similarity score is computed. In this way, the DNN model 500 is configured to receive 2 inputs or pairs of inputs and 1 output of a similarity score of the inputs and can adjust the weights over time.

In some embodiments, during evaluation (e.g., functionality performed by the evaluation component 350 of FIG. 3), the unknown content sets are input to the right branch 503 and compared to the known malicious content (e.g., as indicated in the label database 406 or the labeled data 213) in the left branch 501. The output in some embodiments is a cosine similarity score between the unknown content set and the known malicious content. Because content analyzation is done in pairs, the output process can be repeated for different malicious content until a score is within a distance threshold between the known malicious content and the new content (e.g., the files are close enough to warrant the unknown file being classified as being malicious and/or belonging to a particular family of malicious content). For example at a first iteration, a first known malware file of a first family is input at the first branch 501 and a first unknown file is input at the second branch 503. After a determination, via the function 505, that a distance between the first known malware file and the first unknown file is outside of a threshold (they are not similar), a second known malware file of a second family can be input at the first branch 501 and the first unknown file is input at the second branch to once again compute a similarity score. The process can repeat until there is a similarity score within a threshold between pairs of files. In some embodiments, however, there need not be multiple iterations. Rather, each trained malicious content set can be represented in feature space in a single view or be analyzed at a single time such that embodiments can determine which vector representing a malicious content is closest or has the highest similarity score compared to the new unknown content.

In an example illustration of how evaluation may work, a new unknown file (unknown as to whether it contains malicious content) is converted to a first vector and input at the input layer of the first branch 501 and a second known malicious file is converted into a second vector and input at the input layer of the first branch 501 and is fed through the layers (the hidden layer 1, hidden layer 2, output layer) such that the output layer learns a distance function between the two vectors. The cosine similarity between the two similarity files is then computed via the function 505. In some embodiments, the similarity score occurs as a result of combining both vectors representing the first file and the second file to a single vector by taking the element wise absolute difference between the two vectors. In particular embodiments, the single vector is then put through a sigmoid function to output a similarity score between 0 and 1.

Figure 6:
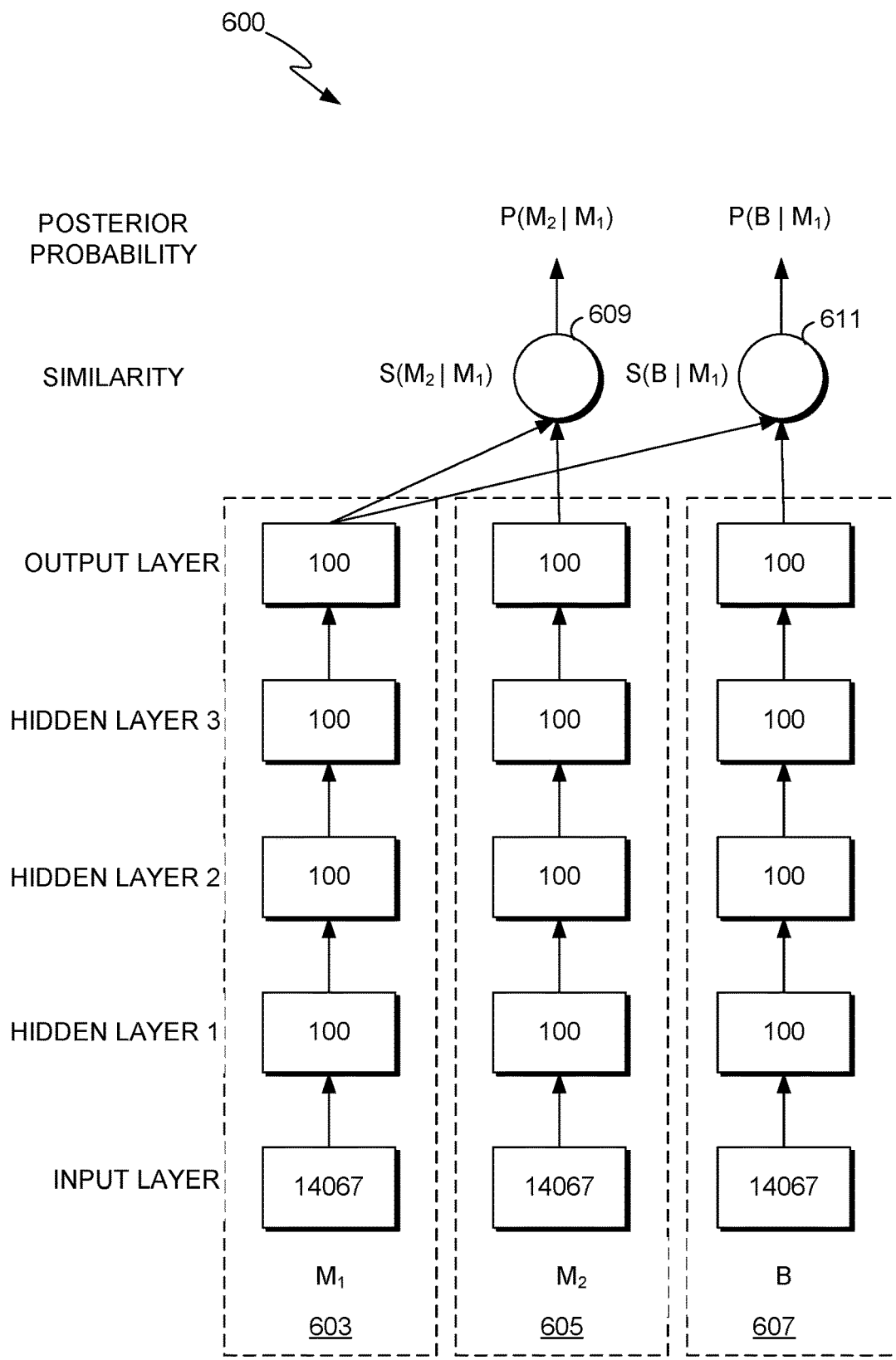
FIG. 6 is a schematic diagram of an example deep learning neural network (DNN) that is used by particular embodiments.

FIG. 6 is a schematic diagram of an example deep learning neural network (DNN) 600 that is used by particular embodiments of the present disclosure. In some embodiments, the deep learning neural network 600 represents the similarity model 416 of FIG. 4, or the model training 309 of FIG. 3. The DNN 600 includes the branches 603 (M1), 605 (M2), and 607 (B). Branch 603 is indicative of processing a first malware content. Branch 605 is indicative of processing a second malware content. And branch 607 is indicative of processing a benign content (or new/unknown content). As illustrated in FIG. 6, each branch includes an input layer, three hidden layers, and an output layer. The branches 603, 605, and 607 are joined at the top by a function 609 and a function 611 to determine similarity between two input contents. It is understood that although there are only three branches 603, 605, and 607 and a particular DNN configuration, any suitable quantity of branches or configurations may exist. Each layer can perform a linear transformation and/or squashing nonlinearity function compared to other layers.

In some embodiments, the DNN 600 represents a variation of a Deep Structured Semantic Model (DSSM), although the DNN 600 is a new model that improves existing models. DSSM may address the high-level goal of training a model, which learns to give different weights to different features based on their importance. However, typical DSSMs may not work when particular embodiments are employed. The input to a typical DSSM system consists of an extremely large set of query-document pairs, which are known to lead to high click-through rates. Distinct query-document pairs are typically unrelated, particularly if the dataset is large and randomly shuffled beforehand. Typical DSSM generates, for each query-matching document, a set of non-matching documents by randomly selecting documents from other instance pairs in the original training set. This idea is known as negative sampling. While negative sampling generally works in the context of a web search, it is not appropriate for the task of identifying similar malware content sets. One problem is due to the fact that many pairs in a dataset belong to the same family of malware. Also, there may be no matching of pairs of benign content since benign content is not typically polymorphic. Accordingly, if features from two malware content sets were used, which are known to be similar, negative sampling will often end up generating content which are supposed to be negative (i.e., non-matching) but will instead match. Consequently, the algorithms will not learn to encourage malware content to have a large distance from benign content. Therefore, some embodiments introduce a variant that explicitly accepts an input of a pair of matching malware files (M1 and M2) and a non-matching benign file (B) to train on.

Some embodiments modify a DSSM training to require the input of an extra item known to be dissimilar to the matching items in the pair. In this context, the third item is the set of selected N-Gram features from a randomly selected benign content. Performing feature selection on a data set may yield sparse binary features corresponding to the input layer size 14067 illustrated in FIG. 6. In embodiments, the first hidden layer is $h_1=f(W_1x+b_1)$ where x is the input vector, $W_1$ and $b_1$ are the learned parameters of the first hidden layer, and f( ) is the activation function for the hidden layers. In some embodiments, the output of the remaining N−1 hidden layer are:

$$h_i=f(W_ih_{i-1}+b_i), i=2,\ldots,N. \qquad \text{Equation 3}$$

In some embodiments, the output layer for each DNN (or branch 603, 605, and 607) used to implement the model is $y=f(W_Nh_{N-1}+b_N)$. In some embodiments, a tanh( ) is used as the activation function for all hidden layers and the output layer for each individual DNN (or branch) where the tanh( ) function in some embodiments is defined as $$\tanh(x) = \frac{1-e^{-2x}}{1+e^{-2x}}.$$

While the conceptual model illustrated in FIG. 6 depicts three deep neural networks or branches (603, 607, and 607), DSSM in some embodiments is actually implemented as two branches using a DNN for the first malware content, and another DNN for the second malware content and the benign content. DNNs with arbitrary architectures may be supported with one restriction—the two branches or neural networks are to have the same number of the output nodes.

In some embodiments, the relevance score between the first malware content and the second malware content or the benign content (represented respectively by feature vectors $F_1$ and $F_2$) is assumed to be proportional to their cosine similarity score of the corresponding semantic concept vectors $Y_{F1}$ and $Y_{F2}$:

$$R(F_1, F_2) = \text{cosine\_sim}(y_{F_1}, y_{F_2}) = \frac{y_{F_1}^T y_{F_2}}{\|y_{F_1}\|\|y_{F_2}\|} \qquad \text{Equation 4}$$

where $Y_{F1}$ is the output of the first DNN (or first branch) and $Y_{F2}$ is the output of the second DNN (or second branch).

In particular embodiments, DSSM training seeks to maximize the conditional likelihood of the second malware content given the first malware content while minimizing the conditional likelihood of the benign content given the first malware content. To do so for the training instance, the posterior probability can first be computed as:

$$P(F \mid M_1) = \frac{\exp(\gamma R(M_1, F))}{\sum_{F \in M_2, B} \exp(\gamma R(M_1, F))} \qquad \text{Equation 5}$$

where γ is a smoothing parameter for the softmax function. The loss function is equivalently minimized during training as:

$$L(\Lambda) = -\log \Pi_{M_1, F} P(F\mid M_1) \qquad \text{Equation 6}$$

where Λ are the model parameters $W_i$ and $b_i$. In some embodiments, back propagation is used with stochastic gradient descent (SGD) to train model parameters.

In some embodiments, unknown content is input into the DNN 600 and a similarity score is determined in a similar manner compared to training. The format can be realized as indicated in table II, for example. Similar to training, the Evaluation Set ID includes the SHA1 file hash of the known malware content, which allows a determination to be made of which malware content is similar to the unknown content. The other two fields include the N-Grams from the known malware file and the unknown file.

To evaluate unknown content, the selected N-Gram features may be included from all of the known variants of families. Then the selected N-Gram features can be included from all of the unknown content that arrive for processing within a particular time period (e.g., a day). Depending on the number of known variants of the families and the incoming rate of unknown files, it may be useful to further pre-filter the number of file pairs to be considered. This can be done using the MinHash algorithm to reduce the number of pairs of content that are used during training or the number of file pairs included during evaluation. Once the set of unknown content pairs has been constructed, they can be evaluated with the trained DNN model 600. If the similarity score exceeds a prescribed threshold, the content may be automatically determined to belong to the same family as the known malware content in the evaluation pair.

Figure 7A:
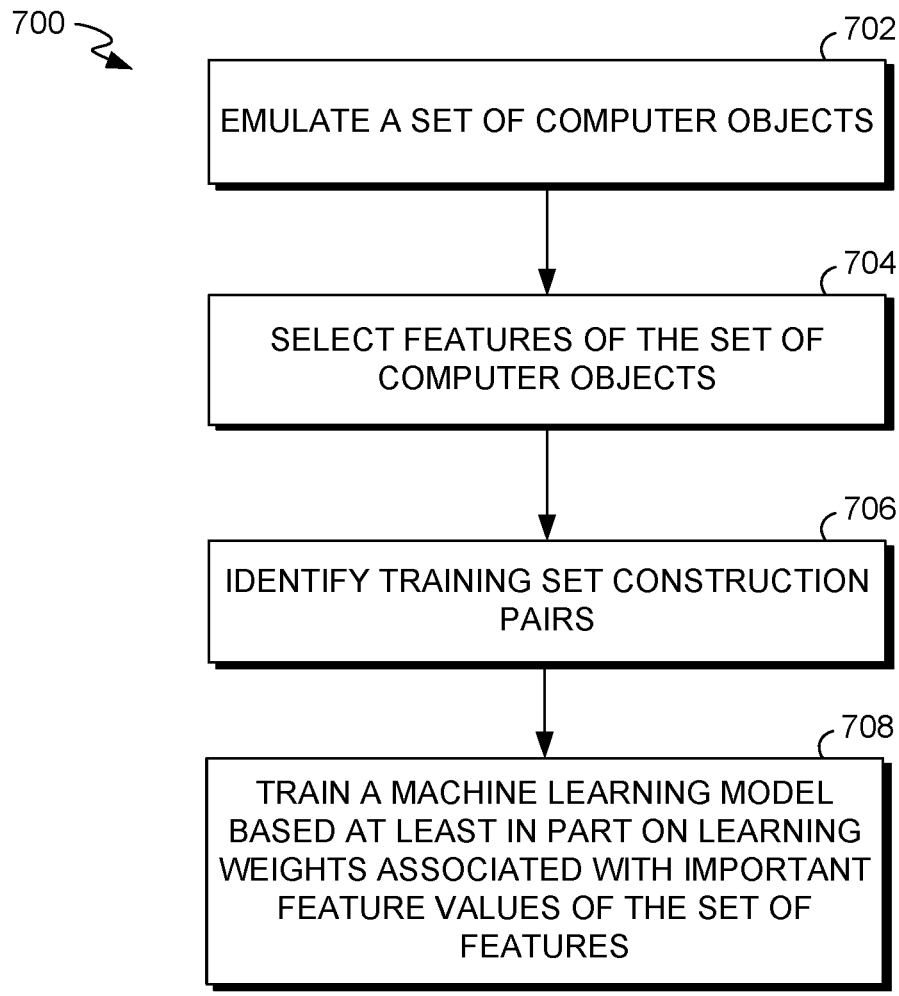
FIG. 7A is a flow diagram of an example process for training a machine learning model, in accordance with some embodiments.

FIG. 7A is a flow diagram of an example process 700 for training a machine learning model, according to some embodiments. The process 700 (and/or any of the functionality described herein (e.g., process 730)) may be performed by processing logic that comprises hardware (e.g., circuitry, dedicated logic, programmable logic, microcode, and the like), software (e.g., instructions run on a processor to perform hardware simulation), firmware, or a combination thereof. Although particular blocks described in this disclosure are referenced in a particular order at a particular quantity, it is understood that any block may occur substantially parallel with or before or after any other block. Further, more (or fewer) blocks may exist than illustrated. Such added blocks may include blocks that embody any functionality described herein. The computer-implemented method, the system (that includes at least one computing device having at least one processor and at least one computer readable storage medium), and/or the computer storage media as described herein may perform or be caused to perform the processes 700, 730, and/or any other functionality described herein. In some embodiments, the process 700 represents the functionality described with respect to the training component 340 of FIG. 3.

Per block 702, a set of computer objects (e.g., files or other content) are emulated (e.g., by the file emulation 303). In some embodiments, emulation includes extracting information from the set of computer objects. For example, calls can be made to unpack or decrypt file strings to obtain the particular values and API calls to obtain particular values. In some embodiments, block 702 represents or includes functionality performed by the emulator 203 of FIG. 2, the detonation and extraction module 404 of FIG. 4, and/or the file emulation 303 of FIG. 3. In some embodiments, the set of computer objects are labeled or pre-classified before the features are analyzed. For example, a plurality of known malicious files can be labelled before training as similar or dissimilar, and a deep learning model can be trained with files that are labeled as benign files, as described, for example, with respect to the label database 406 or the labeled files 313 or the training component 340.

Per block 704, one or more features of the set of computer objects can be selected (e.g., by the feature selector 205). For example, the most discriminative or determinative features can be selected among a group of features. In an illustrative example, file features such as the file's URL and registry key can be selected (e.g., because they are more indicative of determining whether malware is malicious or not), whereas other features, such as the length and format of a file may not be selected (e.g., because they are not as indicative of determining whether malware is malicious). In some embodiments, the feature selection at block 704 represents or includes functionality as described with respect to the feature selector 205 of FIG. 2, the combine and build module 408 of FIG. 4, and/or the feature selection 305 of FIG. 3.

Per block 706, training set construction pairs of computer objects are identified (e.g., by the training set construction component 207). For example, pairs of similar files (e.g., malware files labeled as being in the same family) can be paired, as well as paired dissimilar files (e.g., a benign file and any malicious file can be paired or two malicious files belonging to different malware family members can be paired). In some embodiments, block 706 represents or includes functionality as described with respect to the training set construction component 207, the combine and build module 408, and/or the training set construction 307 of FIG. 3.

Per block 708, a machine learning model (e.g., a deep learning model) is trained based at least in part on learning weights associated with important feature values of the set of features. For example, using the illustration above, a particular malware file may be associated with a particular URL or URL value, as well as a particular registry key value (e.g., container objects with specific bit values, such as LOCAL_MACHINE or CURRENT_CONFIG key values). These weights can be learned for each labeled malware file for a particular family member such that features can be learned, which are the most important for the files being classified as malware or within a certain family member.

In some embodiments, pairs of similar computer objects and dissimilar computer objects (or the computer objects described with respect to block 706) of the set of computer objects are processed or run through a deep learning model by comparing the set of computer objects with and mapping it in feature space. And based at least in part on the processing, weights associated with the deep learning model can be adjusted to indicate the importance of certain features of the set of computer objects for prediction or classification. In some embodiments, the adjusting includes changing an embedding of a first computer object of the similar computer objects in feature space. For example, after a first round or set of rounds of training, it may be unknown what features of the set of computer objects are important for taking on a certain classification or prediction. Accordingly, each feature may take on equal weight (or close to equal weight within a threshold, such as a 2% changed weight) such that all indications of the set of computer objects are substantially close or within a distance threshold in feature space. However, after several rounds of training or any threshold quantity of training, the indications may adjust or change distances from each other based on the feature similarity. The more features of two computer objects that match or are within a threshold value, the closer the two computer objects are to each other, whereas when features do not match or are not within a threshold value, the further away the two computer objects are from each other.

In various embodiments, based at least in part on identifying a label for pairs of the set of computer objects as similar or dissimilar in preparation for training, a deep learning model is trained. The training may include adjusting weights associated with the deep learning model to indicate the importance of certain features of the set of computer objects for prediction or classification. In some embodiments, the training includes learning an embedding of a first computer object (or set of computer objects) of the similar computer objects in feature space. Learning an embedding may include learning the distance between two or more indications representing two or more computer objects (e.g., files) based on feature similarity of values between the two or more indications and adjusting weights of the deep learning model. For example, as described above, the more that features of two files are matching or are within a threshold feature vector value, the closer the two files are to each other in feature space, whereas when features do not match or are not within a feature vector value threshold, the further away the two files are from each other in feature space. Accordingly, in response to various training stages, the strength of connection between nodes or neurons of different layers can be weighted higher or strengthened based on the corresponding learned feature values that are most prominent or important for a particular family of malicious content. In this way, for example, an entire feature space may include an embedding of vectors or other indications that are all learned or embedded in feature spaced based on learning weights corresponding to different features such that indications of computer objects with important features found in similar computer objects are within a threshold distance of each other in feature space, whereas indications corresponding to dissimilar computer objects or computer objects with features that are not important are not within a threshold distance of each other in the same feature space.

In some embodiments, block 708 represents or includes functionality as described with respect to the model training component 209 of FIG. 2, the train similarity module 410 of FIG. 4, the model training 309 of FIG. 3, and/or the DNN 500 of FIG. 5.

Figure 7B:
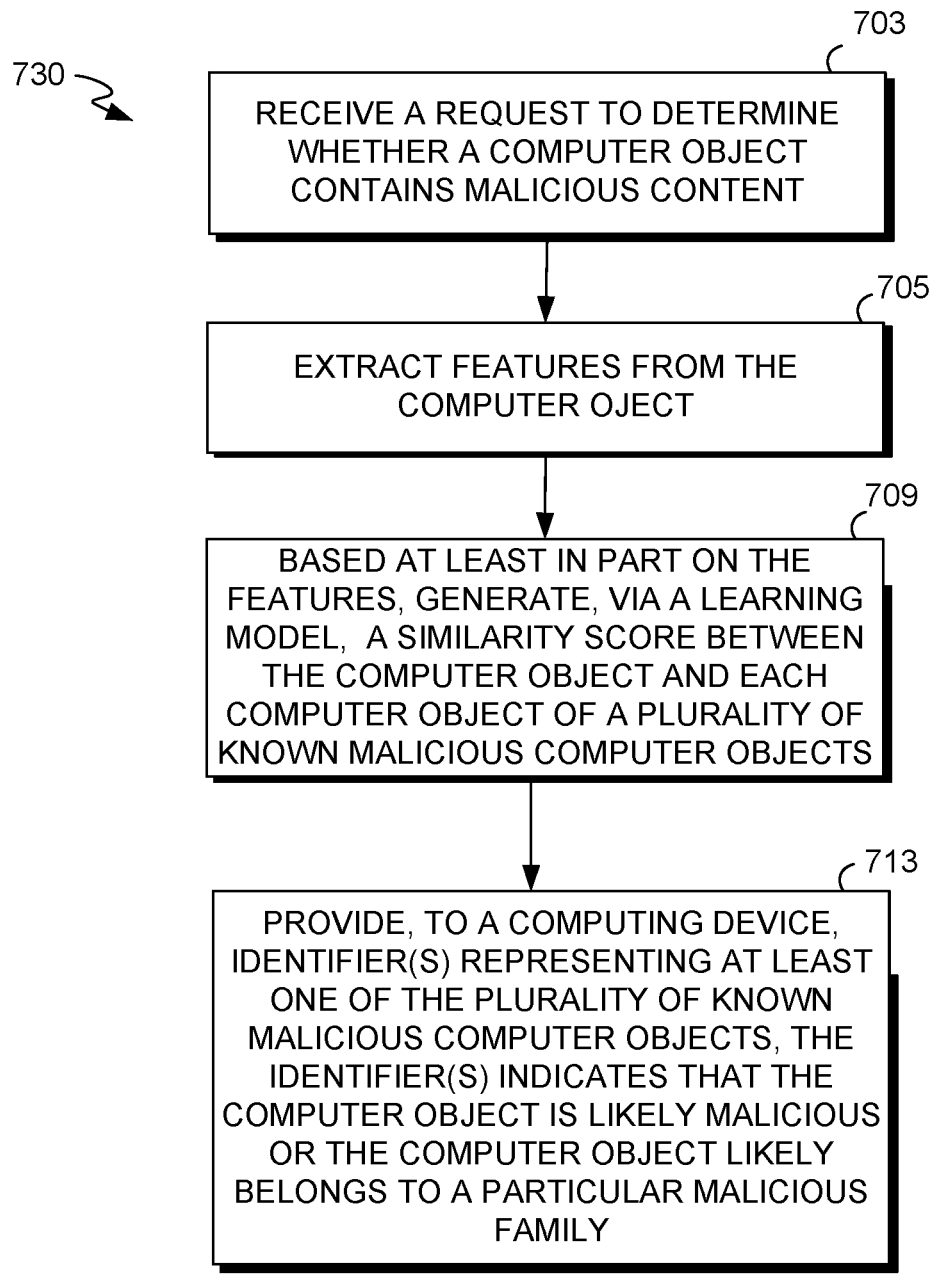
FIG. 7B is a flow diagram of an example process for evaluating a new or unknown content, in accordance with some embodiments.

FIG. 7B is a flow diagram of an example process 730 for evaluating a new or unknown file, according to some embodiments. In some embodiments, the process 730 occurs after the process 700 of FIG. 7A such that the similarity score or prediction made at block 709 is based on using a learned model described with respect to FIG. 7A. In this way, for example, a deep learning model can be trained before receiving the request at block 703. In some embodiments, the process 730 represents or includes functionality described with respect to the evaluation component 350 of FIG. 3. In some embodiments, the "computer object" used in the process 730 is a new or unknown computer object (e.g., a file) representing a test computer object t such that the process 730 represents testing a machine learning model. Alternatively, in some embodiments, the computer object is analyzed at runtime based on a user interfacing with a web application or other app after a machine learning model has already been trained, tested, and deployed. In some embodiments, the computer object used in the process 730 is alternatively any content or computer object, such as code sequence, function, data structure, and/or behavior. Accordingly, for example, any time the word "computer object" is used in the process 730, it can be substituted with the word "content" or "computer object." Likewise, the term "file" can be replaced by the term "computer object" anytime the term "file" is used herein.

Per block 703, a request to determine whether a computer object contains malicious content is received (e.g., via the unknown construction component 220). In some embodiments, malicious content includes known malware signatures or other indications of malware, such as Rootkits, Trojan horses, and the like. In some embodiments, malicious content includes known functionality that malware is known to exhibit, such as waiting a particular amount of time before onset, or injecting a particular sequence of code at different times, or other suitable behavior. In some embodiments, the request at block 703 is received based on a user uploading a file or indication to a web application or app at runtime (e.g., after training and model deployment) in order to determine if the computer object contains any malicious content. In other embodiments, the request at block 703 is received based on a user uploading new or unknown computer objects that the machine learning model has not yet trained on in order to test the machine learning model (e.g., before learning model deployment).

Per block 705, one or more features of the computer object are extracted (e.g., by the emulator 203). In some embodiments, the extracting includes extracting unpacked file strings and extracting API calls, as described, for example, with respect to the file emulation 303 or 333 of FIG. 3. In some embodiments, block 705 includes encoding the unpacked file strings and the API call and associated parameters as a collection of N-Gram characters, as described, for example, with respect to the file emulation 303 and/or 333. As described herein, one limitation with the Jaccard Index-based similarity system is that it cannot distinguish between multiple types of features of the same set or computer object (e.g., EventID, parameter Value 1, Parameter Value 2, etc.). These limitations can be overcome by expanding the EventID to the full API name and encoding the entire API name as a string using character-level trigrams, for example. In some embodiments, block 705 represents or includes the functionality described with respect to the file emulation 303, 333, the detonation and extraction module 404 of FIG. 4, and/or the emulator 203 of FIG. 2.

Per block 709, based on the features (extracted at block 705), a similarity score is generated (e.g., by the unknown evaluator 211), via a deep learning model, between the computer object and each computer object of a plurality of computer objects known to contain malicious content. In some embodiments, the deep learning model is associated with a plurality of indications representing known malicious computer objects. The plurality of indications may be compared with an indication representing the computer object. In some embodiments, based at least in part on processing or running the indication of the computer object through the deep learning model, a similarity score is generated between the computer object and each of the plurality of known malicious computer objects. In some embodiments, the similarity score represents or is indicative of a distance measure (e.g., a cosine distance) between the computer object and each of the plurality of known malicious computer objects. In this way, for example, it can be determined whether an indication of the computer object is within a threshold distance, in feature space, of a set of known malicious computer objects based on the plurality of features. An embedding or orientation of the set of known malicious computer objects in the feature space may be learned via training based on learned weights for different features of known malicious computer objects (e.g., as described with respect to block 708 of FIG. 7A). Accordingly, in some embodiments, the similarity score can represent the specific distances that the computer object is from the other known malicious computer objects (which may each belong to a distinct family). The distance may be specifically based on the exact feature values that the computer object has compared to the known malicious computer objects. For example, if the computer object has the exact feature values that have been weighted toward prominence or importance during training (e.g., as described with respect to block 708 of FIG. 7A) as some known malware computer object, then the distance between these two computer objects would be close within a threshold in feature space, such that the similarity score is high. In effect, the more feature values the computer object has that have been weighted toward importance in training for a known malware computer object, the closer the computer object will be in feature space with the known malware computer object. The opposite is also true. The more feature values that the computer object has that have not been weighted toward importance in training for a known malware computer object, the further away the computer object will be in feature space with the known computer object.

In some embodiments, the learning model used at block 709 is a deep learning model that includes two identical subnetworks that share weights and that are connected by a distance learning function. For example, in some embodiments, the deep learning model represents or includes the DNN 500 of FIG. 5 and associated functionality described herein. In some embodiments, the deep learning model includes two identical subnetworks that share weights and process a pair of similar known malware computer objects and a pair of dissimilar computer objects (e.g., benign files) during training (e.g., as described with respect to block 708 of FIG. 7). For example, these deep learning model embodiments may include the DNN 500 of FIG. 5. In some embodiments, the deep learning model explicitly accepts as input, a pair of matching malware computer objects and a non-matching benign computer object to train on, as described for example with respect to the DNN 600 of FIG. 6. In various embodiments, the deep learning model is associated with a plurality of known malicious computer objects that are embedded in feature space (e.g., the learned model described with respect to block 708 of FIG. 7A). In some embodiments, block 709 represents or includes functionality as described with respect to the unknown evaluator 211, the new file classification module 422, and/or the unknown pair evaluation 311 of FIG. 3.

In some embodiments, the similarity score generated at block 709 additionally or alternatively includes or represents a classification or prediction score (e.g., and an associated confidence level) indicative of classifying or predicting the likelihood that the computer object belongs to each of the plurality of known malicious computer objects. For example, each of the known malicious computer objects may include three distinct families of malware, such as a first Rootkit species, a second Rootkit species, and a third Rootkit species. The similarity score may indicate a 0.96 confidence level or likelihood that the computer object belongs to the first Rootkit species, a 0.32 confidence level or likelihood that the file belongs to the second Rootkit species, and a 0.12 confidence level or likelihood that the file belongs to the third Rootkit species. In some embodiments, this classification is based on the distances in feature space, as described above with respect to block 709.

In some embodiments, the similarity score for the first computer object is set based at least in part on one or more of the plurality of features matching or being close (within a threshold distance) to the changed embedding of the first computer object. In some embodiments, the "changed"

embedding represents the learned or trained embedding with appropriate weights based on feature importance, as described, for example, with regard to the final trained embedding or model in block 708 of FIG. 7A.

In some embodiments, feature space includes indications of benign computer objects such that the determination of whether the indication of the computer object is within a threshold distance is based at least in part on analyzing the indications of benign computer objects. For example, the computer object received at block 703 may in fact be a benign file that does not contain malware. Accordingly, when the file is run through a learning model, the file may be closer in feature space to other benign files based on feature values matching or being more close to other features of benign files analyzed during training. Accordingly, it can be determined that the computer object is outside of the threshold distance of known malware computer objects (and within a threshold distance of benign computer objects). In various embodiments, the indication includes a vector that is embedded in the feature space based on two branches of the deep learning model that learns a distance function between two inputs (computer objects), wherein a first input is the vector, and the second input is another vector representing a first malware computer object of the set of known malware computer objects. For example, this is described with respect to the functionality and branches described with respect to the deep learning model 500 of FIG. 5. In some embodiments, block 709 represents or includes the functionality described with respect to the unknown evaluator 211 of FIG. 2, the unknown pair evaluation 311, and/or the new file classification module 422 of FIG. 4.

Per block 713, one or more identifiers (e.g., names of particular malware families or files) representing at least one of the plurality of known malicious computer objects is provided (e.g., by the rendering component 217) or generated on a computing device. The one or more identifiers may indicate that the computer objects is likely malicious and/or the computer object likely belongs to a particular malicious family. In some embodiments, at least partially responsive to the similarity score being above a threshold for a set of the plurality of known malicious computer objects and the computer object, a computing device is provided a set of identifiers representing the set of the plurality of known malicious computer objects in a ranked order. A highest ranked identifier indicates that the computer object likely contains malicious content and/or the computer object likely belongs to a particular family or type of malicious content relative to other families associated with lower ranked identifiers. For example, the server 106 can provide, to the user device 102a, a user interface or other display that shows each ranked identifier (e.g., different malware family types, such as virus XYZ, virus TYL, and virus BBX), and the probability or likelihood (e.g., a confidence level) that the computer object belongs to or is classified as one of the different malware family types (e.g., virus XYZ-0.96, virus TYL-0.82, and virus BBX-0.46, which is indicative that the computer object likely contains the virus XYZ species). Accordingly, this describes a set of indicators of the set of known malicious computer objects that are scored and provided to the user interface such that the providing indicates that the computer object is of particular families of malware.

In some embodiments, at least partially responsive to the similarity score being above a threshold for at least one of the plurality of known malicious computer objects, a computing device is provided at least one identifier representing the at least one of the plurality of known malicious computer objects. In some embodiments, the at least one identifier indicates that the computer object is likely malicious and the content likely belongs to a same family as the at least one of the plurality of known malicious computer objects, as described above with respect to the virus XYZ-0.96, virus TYL-0.82, and virus BBX-0.46, which is indicative that the computer object likely contains the virus XYZ species. In some embodiments, the similarity score being above the threshold is based at least in part on the learned embedding of the first computer object (e.g., as described with respect to block 708 of FIG. 7A). For example, an indication of the computer object may be mapped in feature space that has a trained embedding such that the each known malware computer object indication within a threshold distance (e.g., cosine distance) from the computer object in feature space can be provided to the computing device. Being within the threshold distance may be indicative of the computer objects being similar based on computer objects containing feature values that have also been weighted in known computer objects towards importance for classification. Accordingly, one or more identifiers representing the known computer objects can be provided to the computing device because they are indicative of being similar to the computer object based on the learned embedding.

In some embodiments, at least partially responsive to determining whether the indication of the computer object is within the threshold distance (e.g., as described with respect to the similarity score of block 709), an indicator indicating whether the computer object contains malicious content is provided to a user interface of a computing device. For example, embodiments of block 713 can alternatively or additionally include functionality that states the probability or likelihood that the computer object contains malware (e.g., without regard to what malware family the file belongs to or without a ranked list of candidate malware families or computer objects that the computer object is associated with). In some embodiments, block 713 represents or includes the functionality as described with respect to the rendering component 217 of FIG. 2, the unknown file prediction 317 of FIG. 3, and/or the similar files with KNN classification data 424.

Embodiments of the disclosure may be described in the general context of computer code or machine-useable instructions, including computer-useable or computer-executable instructions, such as program modules, being executed by a computer or other machine, such as a smartphone, a tablet PC, or other mobile device, server, or client device. Generally, program modules, including routines, programs, objects, components, data structures, and the like, refer to code that performs particular tasks or implements particular abstract data types. Embodiments of the disclosure may be practiced in a variety of system configurations, including mobile devices, consumer electronics, general-purpose computers, more specialty computing devices, or the like. Embodiments of the disclosure may also be practiced in distributed computing environments where tasks are performed by remote-processing devices that are linked through a communications network. In a distributed computing environment, program modules may be located in both local and remote computer storage media including memory storage devices.

Some embodiments may comprise an end-to-end software-based system that can operate within system components described herein to operate computer hardware to provide system functionality. At a low level, hardware processors may execute instructions selected from a machine language (also referred to as machine code or native) instruction set for a given processor. The processor recognizes the native instructions and performs corresponding low level functions relating, for example, to logic, control and memory operations. Low level software written in machine code can provide more complex functionality to higher levels of software. Accordingly, in some embodiments, computer-executable instructions may include any software, including low level software written in machine code, higher level software such as application software and any combination thereof. In this regard, the system components can manage resources and provide services for system functionality. Any other variations and combinations thereof are contemplated with embodiments of the present disclosure.

Figure 8:
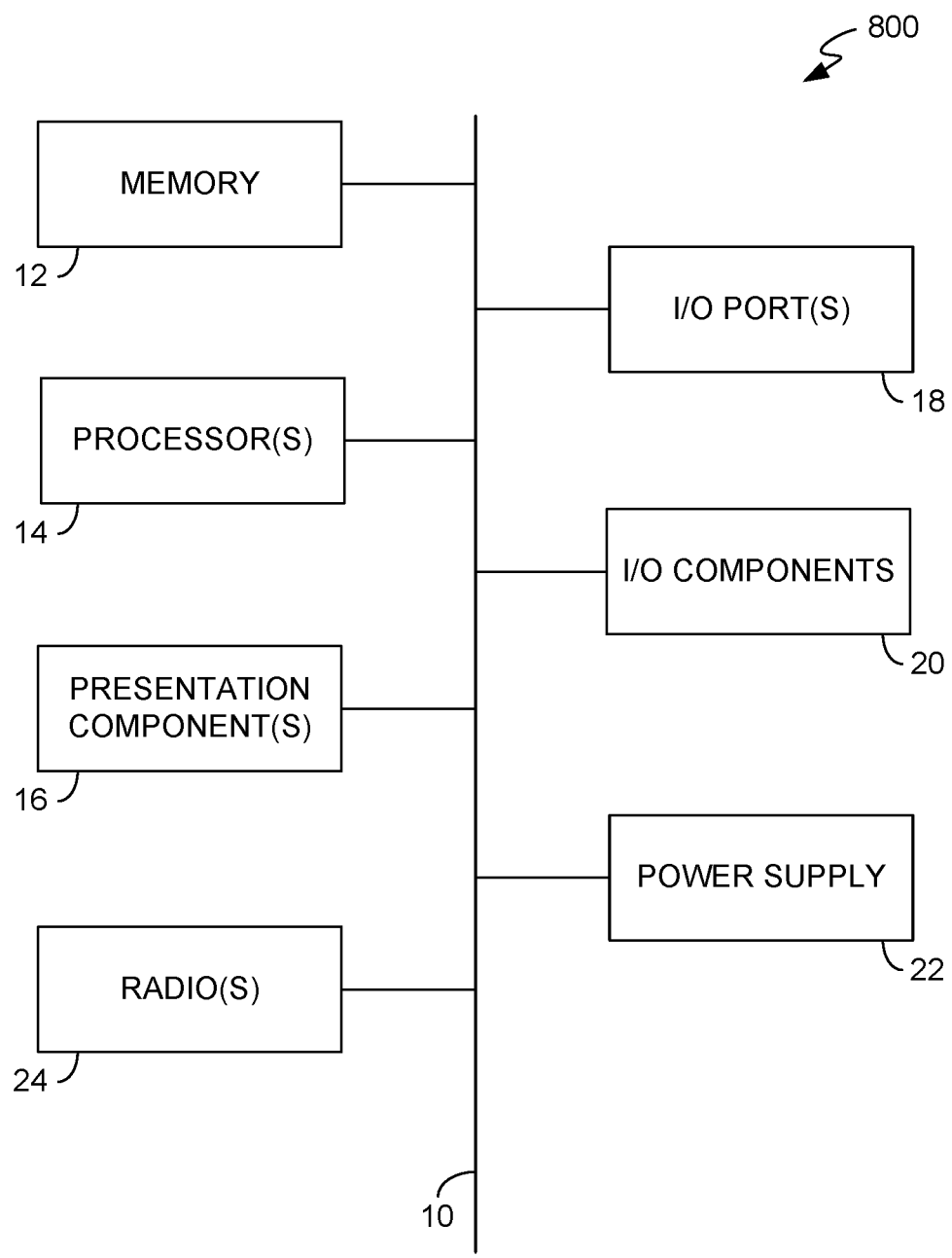
FIG. 8 is a block diagram of a computing device, in accordance with some embodiments.

With reference to FIG. 8, computing device 800 includes a bus 10 that directly or indirectly couples the following devices: memory 12, one or more processors 14, one or more presentation components 16, one or more input/output (I/O) ports 18, one or more I/O components 20, and an illustrative power supply 22. Bus 10 represents what may be one or more busses (such as an address bus, data bus, or combination thereof). Although the various blocks of FIG. 8 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 8 is merely illustrative of an exemplary computing device that can be used in connection with one or more embodiments of the present disclosure. Distinction is not made between such categories as "workstation," "server," "laptop," "handheld device," or other computing device, as all are contemplated within the scope of FIG. 8 and with reference to "computing device."

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 800. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 12 includes computer storage media in the form of volatile and/or nonvolatile memory. The memory may be removable, non-removable, or a combination thereof. Exemplary hardware devices include solid-state memory, hard drives, optical-disc drives, or other hardware. Computing device 800 includes one or more processors 14 that read data from various entities such as memory 12 or I/O components 20. In some embodiments, the processors 14 execute instruction in memory to perform any operation or functionality described herein, such as respect with the processes 700 and/or 730 of FIGS. 7A and 7B. Presentation component(s) 16 presents data indications to a user or other device. Exemplary presentation components include a display device, speaker, printing component, vibrating component, and the like.

The I/O ports 18 allow computing device 800 to be logically coupled to other devices, including I/O components 20, some of which may be built in. Illustrative components include a microphone, joystick, game pad, satellite dish, scanner, printer, wireless device, and the like. The I/O components 20 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 800. The computing device 800 may be equipped with depth cameras, such as stereoscopic camera systems, infrared camera systems, RGB camera systems, and combinations of these, for gesture detection and recognition. Additionally, the computing device 800 may be equipped with accelerometers or gyroscopes that enable detection of motion. The output of the accelerometers or gyroscopes may be provided to the display of the computing device 800 to render immersive augmented reality or virtual reality.

Some embodiments of computing device 800 may include one or more radio(s) 24 (or similar wireless communication components). The radio 24 transmits and receives radio or wireless communications. The computing device 800 may be a wireless terminal adapted to receive communications and media over various wireless networks. Computing device 800 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions, and the like) can be used in addition to or instead of those shown.

Embodiments of the present disclosure have been described with the intent to be illustrative rather than restrictive. Embodiments described in the paragraphs above may be combined with one or more of the specifically described alternatives. In particular, an embodiment that is claimed may contain a reference, in the alternative, to more than one other embodiment. The embodiment that is claimed may specify a further limitation of the subject matter claimed. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

Example Experimental Result Embodiments

The following describes several example experiments to evaluate the performance (e.g., accuracy and error rate) of embodiments of the present disclosure (e.g., which use the DNNs 500 and/or 600) compared to existing technologies. First, the setup and hyperparameters used in the experiments are described. Next, the performance of embodiments are compared with the performance with that of a baseline Jaccard Index-based system for the task of file similarity— the Jaccard Index has been used in several previously proposed malware detection systems. Finally, the performance of a K-Nearest Neighbor classifier is investigated based on features from an SNN and the Jaccard Index computed from the set of highly prevalent malware files.

Dataset. Analysts from MICROSOFT Corporation provided researchers with the raw data logs extracted during dynamic analysis of 190,546 Windows portable execution (PE) files from eight highly prevalent malware families and 208,061 logs from benign files. These files were scanned in April 2019 by the company's production file scanning infrastructure over a period of several weeks using their production anti-malware engine.

Following the procedure described above (e.g., as illustrated in FIG. 3), a training set with 596,478 pairs were created of either two similar malware files (296,871 pairs) or a malware file and a benign file (299,607 pairs). Each row in the training set is unique. A similar malware pair is chosen to be distinct and a dissimilar pair is formed from the combination of a randomly selected malware file and benign file. For testing, a separate holdout dataset is constructed consisting of 311,787 distinct pairs, which include 119,562 unique similar pairs and 192,225 unique dissimilar pairs. The detailed breakdown per family is shown in the table 900 of FIG. 9.

Experimental Setup. The SNN was implemented and trained using the Py Torch deep learning framework. The deep learning results were computed on an NVidia P100 GPU (Graphics Processing Unit). The Jaccard Index computations were also implemented in Python. For learning, the minibatch size was set to 256, and the learning rate was set to 0.01. In some embodiments, the network architecture parameters are illustrated as shown in FIG. 5.

File Similarity. Some embodiments of the present disclosure, which employ an SNN variant to learn a file embedding in the feature space, are compared to a Jaccard Index-based baseline technology system. The Jaccard Index (JI) for sets A and B is: JI $(A, B)=(A \cap B)/(A \cup B)$. The elements of the sets correspond to the N-Gram encoding described above (e.g., with respect to the file emulation 303) for the corresponding feature type (e.g., strings, API events, and their parameters).

Figure 10:
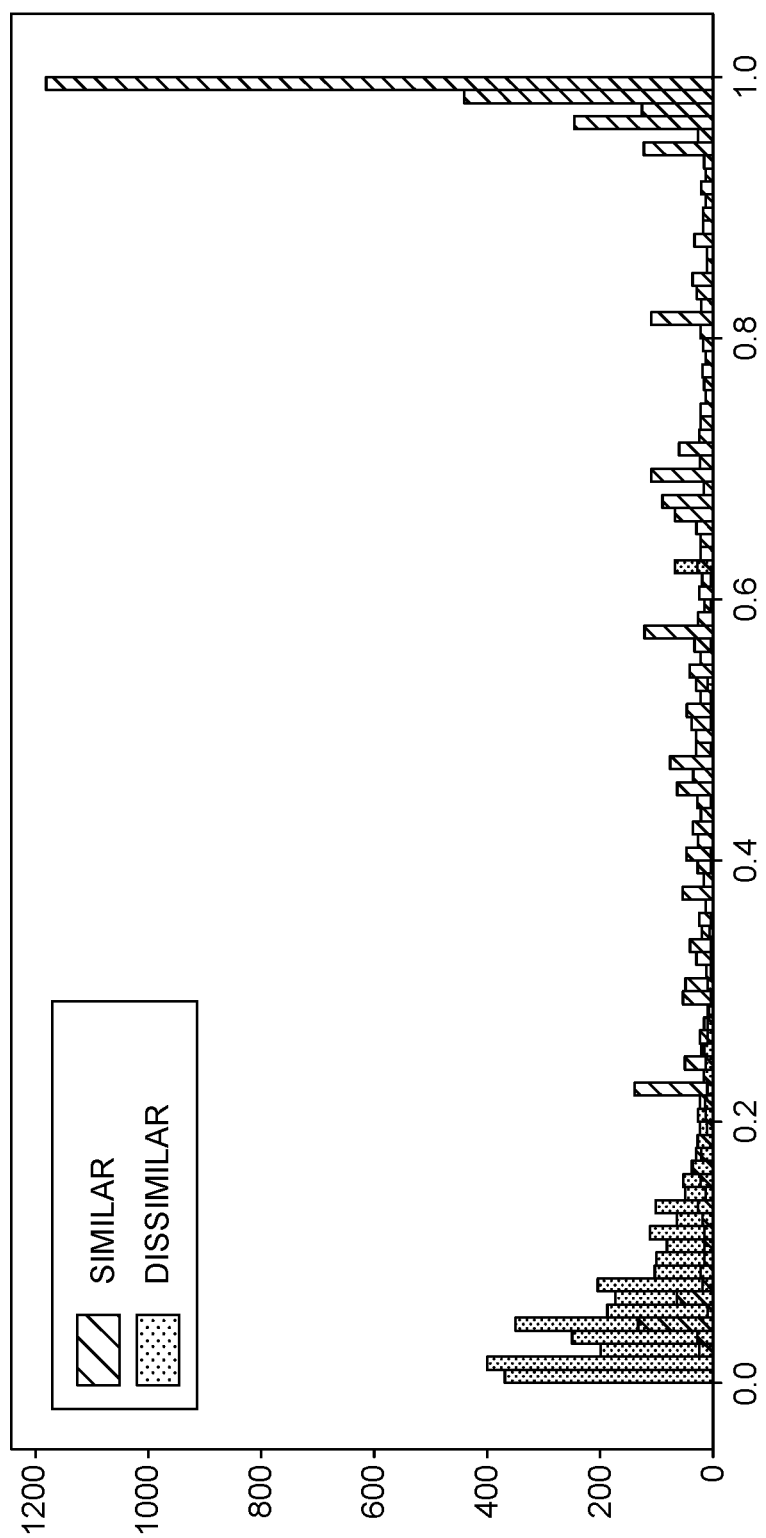
FIG. 10 is a diagram of a Jaccard Index similarity score distribution for similar and dissimilar files, in accordance with some embodiments.

First, the Jaccard Index for both similar and dissimilar files can be compared as a baseline, as indicated in FIG. 10. FIG. 10 represents a Jaccard Index similarity score distribution for the similar and dissimilar files. In general, the Jaccard Index is typically high for similar files and small for dissimilar one, as expected. However, FIG. 10 indicates that the Jaccard Index for a reasonable large number of similar files is less than 0.9. The Jaccard Index for dissimilar files also has a small peak near the value 0.65.

Figure 11:
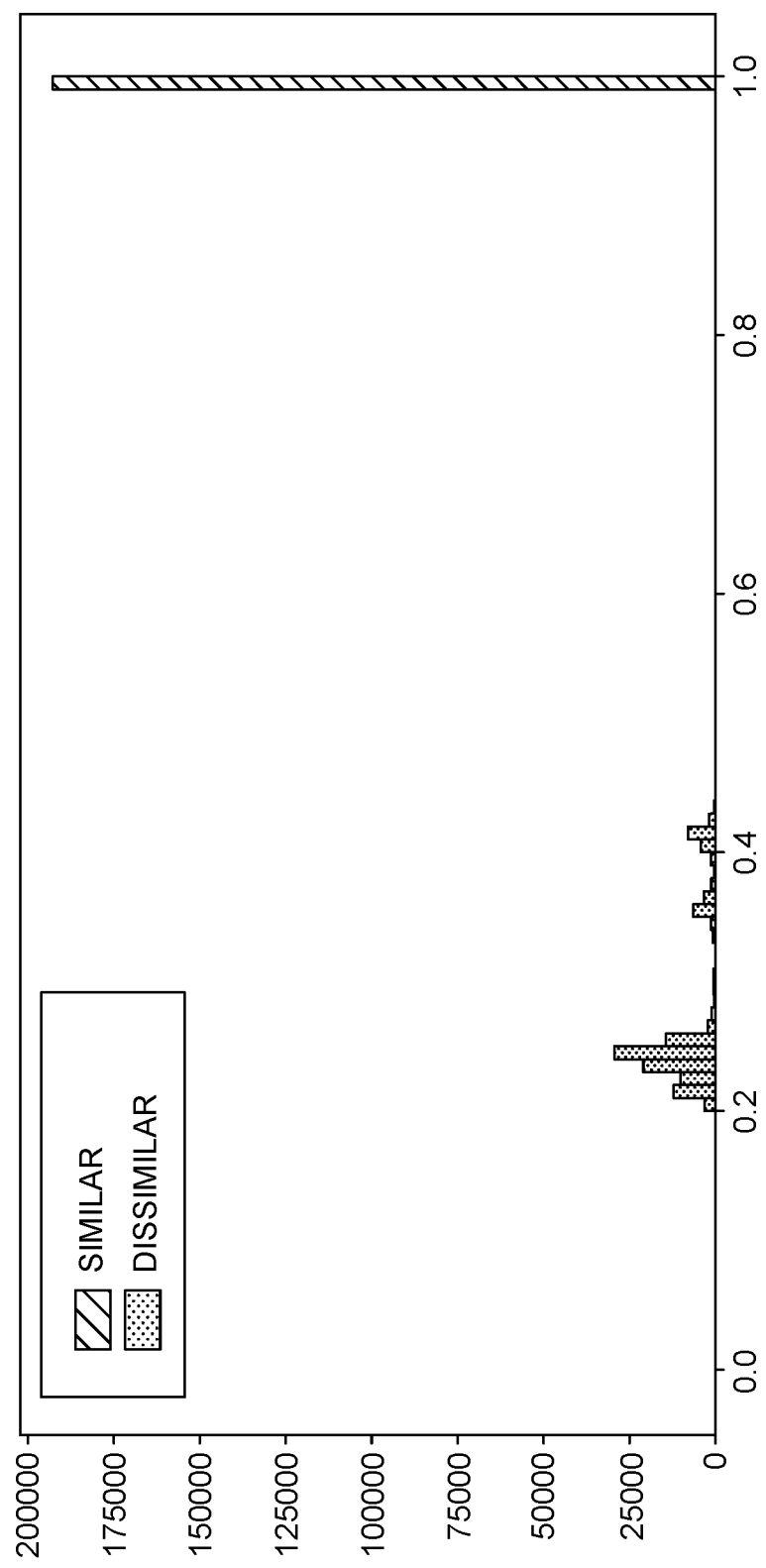
FIG. 11 is a diagram of an SNN similarity score distribution for similar and dissimilar files, in accordance with some embodiments.

FIG. 11 illustrates an SNN similar score distribution for the similar and dissimilar files. For FIG. 11, the SNN similarity score for both similar and dissimilar files are compared. Since the range of the SNN scores is [−1, 1], while the Jaccard Index varies from [0, 1], the SNN score is transformed to a new value from [0, 1] so that all plots can be compared fairly. In contrast to the Jaccard Index similarity scores, the SNN similarity behaves as expected where the model learns to emphasize the weights from similar files to produce a cosine similarity score very close to 1.0 and the weights from dissimilar files to produce a cosine similarity value, which is well separated from the similarity files (e.g., are closer to 0). This behavior makes it much easier to set a value for the SNN threshold (e.g., a similarity score threshold) to automatically predict that two files are indeed similar.

Figure 12:
FIG. 12 is an example table illustrating performance measurements for KNN for different highly prevalent malware families.
Figure 13:
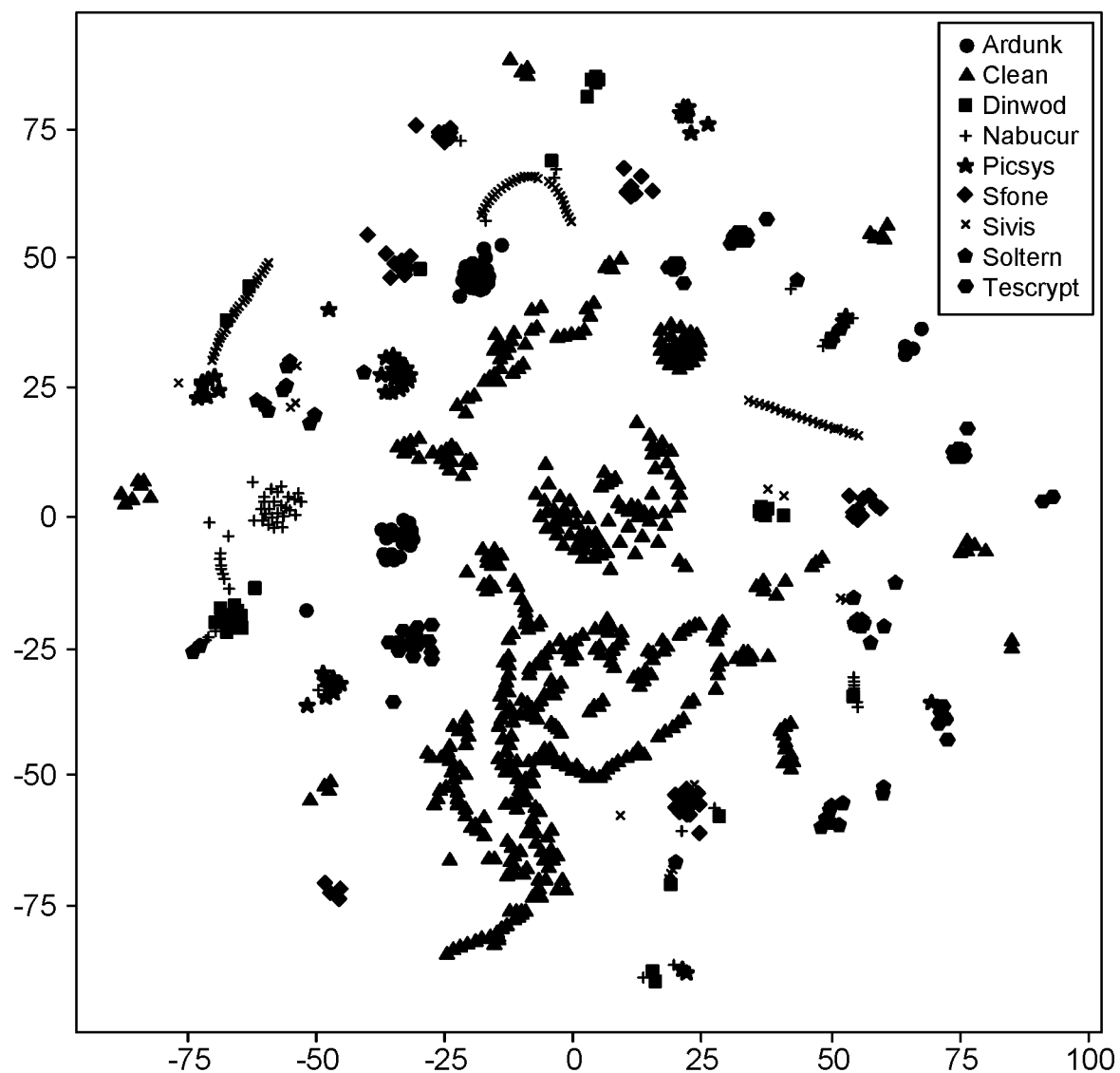
FIG. 13 is an example visualization chart illustrating the separability of the latent vectors of the malware classes using the t-sne method, in accordance with some embodiments.

During these tests, it was found that computing the Jaccard Index is extremely slow. To deal with this limitation and in order to have a Jaccard Index experiment finish within 2-3 days, the MinHash algorithm described herein was implemented, where the MinHash filtering threshold is varied. Three different tests were conducted including: (1) training set pairs=50,000 and test set pairs=10,000 with a threshold value of 0.5; (2) training set pairs=10,000 and test set pairs=10,000 with a threshold value of 0.8; and (3) training set pairs=100,000 and test set pairs=10,000 with a threshold value of 0.8. The results reported in FIG. 10 and the table 1200 of FIG. 12 are from test (1), with an error rate of 0.42%. The corresponding error rates for tests (2) and (3) are significantly worse at 3.12% and 8.47%, respectively. Using the GPU, the results for the SNN for all 143,278 items in the test set were evaluated within 2 days. Thus, the SNN and other embodiments described herein are not only much more accurate, but are also much faster to evaluate compared to the Jaccard Index.

Family Classification. While FIGS. 10 and 11 demonstrate that embodiments of the present disclosure produce a much improved similarity score compared to the Jaccard Index technologies, it is useful to understand if this leads to improved detection rates. To investigate, the K-Nearest Neighbor Classification results, with K=1, for these two similarity models (Jaccard Index and SNN) are compared. The FACEBOOK AI similarity search library was utilized.

Evaluating a KNN classifier in certain situations requires a revisit of the test set. As described herein, similar pairs of malware files can be formed whose SignatureID and family match and dissimilar pairs where the second file is known to be benign. Embodiment models are then used to compare an unknown file to the set of known malware files (e.g., the left branch 501 of FIG. 5) to determine if it is similar to any of the previously detected malware files. However, to evaluate the output of the embodiment model for a KNN classifier, an unknown file is instead compared to a set of known malware and known benign files. For the test data set, this may be the set of files denoted as F and that are processed through the right branch 503. In essence, the set of known test files are swapped from the left branch 501 of FIG. 5 to the right branch 503 of FIG. 5. When evaluating an unknown file using the KNN classifier, the distances from the unknown file to the known set of malware and benign files can be computed, and the label can be determined from the majority vote of the K closest files. It should be noted that in the following test, the test files are all malicious and determination of the malware file's family was attempted.

Since the dataset does not allow forming pairs of similar benign files, the false positive and true negative rates are not measured. If a file is benign, the score for similar benign files from the data may not be computed. For example, Chrome-.exe is not similar to AcroRd32.exe even though both files are benign. If a file is a non-matching file, certain embodiments do not compute this because the KNN results have been generated from a combination of the matching and non-matching pairs.

FIG. 12 summarizes several performance metrics for malware family classification. The table 1200 indicates that the SNN or particular embodiments described herein outperforms or is equivalent to the JI for most of the families. Overall, the SNN has an error rate of 0.11% compared to 0.420% for the JI, which is a significant difference. The results suggest that the individual malware families are well separated in the latent vector space where the latent vector is the final embedding, which is output by each branch of the of the model in FIG. 5, for example. Experiments also utilized a visualization chart (shown in FIG. 13) that illustrates the visualization of the separability of the latent vectors of the malware classes using the t-sne method. The t-sne method is used to project vectors into a two-dimensional space, which confirms that these classes are indeed well separated.

To avoid detection, malware sometimes employs cloaking, which occurs when it does not perform any malicious action if it detects that it may be executing in an emulated or virtualized environment typically used by dynamic analysis systems. To overcome these attacks, systems can be utilized that execute an unknown file in multiple analysis systems and search for differences among the outputs, which may indicate that malware is using cloaking.

Malware may also try to delay the execution of its malicious code hoping that the emulation engine eventually halts after some amount of time. To prevent this evasion technique, some systems may alter the system time. This in turn leads to malware checking the time from the internet. If malware is not able to connect to the internet to check the time, it may choose to halt all malicious activity.

Some adversarial learning systems craft examples that are misclassified by a deep neural network. For malware analyses, a white-box attack may require access to the DNN's model parameters, which means successfully breaching an anti-malware company's corporate network if the DNN analyzes unknown files in a backend service. Thus, successfully employing this attack on a backend service may be very challenging. If a DNN were to be run locally on the client computer, attackers may be able to reverse engineer the model and successfully run a variant of this attack on model embodiments described herein (e.g., FIG. 5 and FIG. 6). To combat this attack, embodiments run a DNN or other model in a Software Guard Extension (SGX) enclave. This is a set of security instruction codes that are built into a CPU. The enclave is decrypted on the fly only within the CPU itself.

When not successfully subverted by emulation and virtualization detection techniques, embodiments of dynamic analysis described herein have been shown to yield excellent results in detection of unknown malicious content. As described herein, a dynamic analysis system for learning malware file similarity based on a deep learning has been proposed. The performance of embodiments on highly prevalent families (which may require a large amount of support by analysts and automated analysis) is described herein. It has been shown that embodiments described herein offer significant improvement with regard to error rate compared to a similar system based on the Jaccard Index, which has been previously proposed in several other technologies. The results show that embodiments reduce the KNN classification error rate on these highly prevalent families from 0.420% for the Jaccard Index to 0.011% for an SNN with two hidden layers. As such, it is believed that embodiments described herein can be an effective technological tool for reducing the amount of automation costs and the amount of analysts' time spent combatting these malware families.

The following embodiments represent exemplary aspects of concepts contemplated herein. Any one of the following embodiments may be combined in a multiple dependent manner to depend from one or more other clauses. Further, any combination of dependent embodiments (e.g., clauses that explicitly depend from a previous clause) may be combined while staying within the scope of aspects contemplated herein. The following clauses are exemplary in nature and are not limiting:

Clause 1. A computer-implemented method comprising: receiving a request to determine whether a computer object contains malicious content; extracting a plurality of features from the computer object; based at least in part on the plurality of features, generating, via a deep learning model, a similarity score between the computer object and each computer object of a plurality of computer objects that are known to contain malicious content, the deep learning model being associated with a plurality of indications representing the plurality of computer objects, the plurality of indications being embedded in feature space; and at least partially responsive to the similarity score being above a threshold for a set of the plurality of computer objects and the computer object, providing, to a computing device, a set of identifiers representing the set of the plurality of computer objects in a ranked order, wherein a highest ranked identifier indicates that the computer object likely belongs to a particular family of malicious content.

Clause 2. The method of clause 1, wherein the extracting of the plurality of features includes extracting unpacked file strings and extracting API calls.

Clause 3. The method of clause 2, further comprising encoding the unpacked file strings and the API calls and associated parameters as a collection of N-Gram characters.

Clause 4. The method of clause 1, wherein the deep learning model includes two identical subnetworks that share weights and that are connected by a distance learning function.

Clause 5. The method of clause 1, wherein the deep learning model explicitly accepts, as input, a pair of matching malware files and a non-matching benign file to train on.

Clause 6. The method of clause 1, further comprising training the deep learning model before the receiving of the request, the training of the deep learning model includes: emulating a set of files, the emulating includes extracting information from the set of files; processing pairs of similar files and dissimilar files of the set of files through the deep learning model; based at least in part on the processing, adjusting weights associated with the deep learning model to indicate an importance of certain features of the set of files for prediction or classification, wherein the adjusting includes changing an embedding of a first file of the similar files in the feature space.

Clause 7. The method of clause 6, wherein the similarity score for the computer object is set based at least in part on one or more of the plurality of features matching or being close to the changed embedding of the first file.

Clause 8. One or more computer storage media having computer-executable instructions embodied thereon that, when executed, by one or more processors, cause the one or more processors to perform a method, the method comprising: receiving a request to determine whether content is malicious; extracting a plurality of features from the content; based on the plurality of features, generating, via a deep learning model, a similarity score between the content and each of a plurality of known malicious contents, each of the plurality of known malicious contents belonging to a distinct malicious family; and at least partially responsive to the similarity score being above a threshold for the content and a known malicious content of the plurality of known malicious contents, providing, to a computing device, an identifier representing the known malicious content, wherein the identifier indicates that the content is likely malicious or the content likely belongs a same malicious family as the known malicious content.

Clause 9. The computer storage media of clause 8, wherein the plurality of known malicious contents are labelled during training as similar or dissimilar, and wherein the deep learning model is further trained with content that is labeled as benign.

Clause 10. The computer storage media of clause 8, further comprising expanding an EventID feature of the content to a full API name and encoding the full API name as a string using character-level trigrams.

Clause 11. The computer storage media of clause 8, wherein the deep learning model includes two identical subnetworks that share weights and that process a pair of similar known malware files and a pair of dissimilar files during training, wherein the pair of dissimilar files include benign files.

Clause 12. The computer storage media of clause 8, wherein the deep learning model explicitly accepts, as input, a pair of matching malware files and a non-matching benign file to train on.

Clause 13. The computer storage media of clause 8, the method further comprising training the deep learning model before the receiving of the request, the training of the deep learning model includes: receiving a set of files that are labeled as distinct sets of malware families or benign files; emulating the set of files, the emulating includes extracting information from the set of files; identifying a label for pairs of the set of files as similar or dissimilar in preparation for training; and based at least in part on the identifying, training the deep learning model, the training includes adjusting weights associated with the deep learning model to indicate an importance of certain features of the set of files for prediction or classification, wherein the training includes learning an embedding of a first file of the similar files in feature space.

Clause 14. The computer storage media of clause 13, wherein the similarity score being above the threshold is based at least in part on the learned embedding of the first file.

Clause 15. A system comprising: one or more processors; and one or more computer storage media storing computer-useable instructions that, when used by the one or more processors, cause the one or more processors to perform a method, the method comprising: receiving a request to determine whether a computer object contains malicious content; extracting a plurality of features from the computer object; determining whether an indication of the computer object is within a threshold distance, in feature space, to a set of known malicious computer objects based on the plurality of features, wherein an embedding of the set of known malicious computer objects in the feature space is learned via training based on learned weights for different features of the set of known malicious computer objects; and at least partially responsive to determining whether the indication of the computer object is within the threshold distance, providing, to a user interface of a computing device, an identifier indicating whether the computer object contains malicious content.

Clause 16. The system of clause 15, wherein a set of indicators of the set of known malicious computer objects are scored and provided to the user interface, the providing indicating a likelihood that the computer object is of particular families of malware.

Clause 17. The system of clause 15, wherein the feature space also includes indications of benign files and wherein the determination of whether the indication of the computer object is within a threshold distance is based at least in part on analyzing the indications of the benign files.

Clause 18. The system of clause 15, wherein the indication includes a vector that is embedded in the feature space based on two branches of a deep learning model that learns a distance function between two inputs, wherein a first input is the vector, and a second input is another vector representing a first malware file of the set of known malicious computer objects.

Clause 19. The system of clause 15, wherein the feature space is associated with a deep learning model that includes two identical subnetworks that share weights and that are connected by a distance learning function.

Clause 20. The system of clause 15, wherein the feature space is associated with a deep learning model that explicitly accepts, as input, a pair of matching malware files and a non-matching benign file to train on.

The invention claimed is:

1. A computer-implemented method comprising:
receiving a request to determine whether a computer object contains malicious content;
extracting a plurality of features from the computer object;
based at least in part on the plurality of features, generating, via a deep learning model, a similarity score between the computer object and each computer object of a plurality of computer objects that are known to contain malicious content, the deep learning model being associated with a plurality of indications representing the plurality of computer objects, the plurality of indications being embedded in feature space, wherein the deep learning model explicitly accepts, as input, a pair of matching malware files and a non-matching benign file to train on; and
at least partially responsive to the similarity score being above a threshold for a set of the plurality of computer objects and the computer object, causing a set of identifiers representing the set of the plurality of computer objects to be provided, to a computing device, in a ranked order, wherein a highest ranked identifier indicates that the computer object likely belongs to a particular family of malicious content.

2. The method of claim 1, wherein the extracting of the plurality of features includes extracting unpacked file strings and extracting API calls.

3. The method of claim 2, further comprising encoding the unpacked file strings and the API calls and associated parameters as a collection of N-Gram characters.

4. The method of claim 1, wherein the deep learning model includes two identical subnetworks that share weights and that are connected by a distance learning function.

5. The method of claim 1, wherein the deep learning model includes a Siamese Neural Network (SNN).

6. The method of claim 1, further comprising training the deep learning model before the receiving of the request, the training of the deep learning model includes:
emulating a set of files, the emulating includes extracting information from the set of files;
processing pairs of similar files and dissimilar files of the set of files through the deep learning model;
based at least in part on the processing, adjusting weights associated with the deep learning model to indicate an importance of certain features of the set of files for prediction or classification, wherein the adjusting includes changing an embedding of a first file of the similar files in the feature space.

7. The method of claim 6, wherein the similarity score for the computer object is set based at least in part on one or more of the plurality of features matching or being close to the changed embedding of the first file.

8. One or more computer storage media having computer-executable instructions embodied thereon that, when executed, by one or more processors, cause the one or more processors to perform a method, the method comprising:
receiving a request to determine whether content is malicious;
extracting a plurality of features from the content;
expanding an EventID feature of the content to a full API name and encoding the full API name as a string using character-level trigrams;
based on the plurality of features and the expanding, generating, via a deep learning model, a similarity score between the content and each of a plurality of known malicious contents, each of the plurality of known malicious contents belonging to a distinct malicious family; and
at least partially responsive to the similarity score being above a threshold for the content and a known malicious content of the plurality of known malicious contents, causing an identifier representing the known malicious content to be provided to a computing device, wherein the identifier indicates that the content is likely malicious or the content likely belongs a same malicious family as the known malicious content.

9. The computer storage media of claim 8, wherein the plurality of known malicious contents are labelled during training as similar or dissimilar, and wherein the deep learning model is further trained with content that is labeled as benign.

10. The computer storage media of claim 8, wherein the deep learning model includes a Siamese Neural Network (SNN).

11. The computer storage media of claim 8, wherein the deep learning model includes two identical subnetworks that share weights and that process a pair of similar known malware files and a pair of dissimilar files during training, wherein the pair of dissimilar files include benign files.

12. The computer storage media of claim 8, wherein the deep learning model explicitly accepts, as input, a pair of matching malware files and a non-matching benign file to train on.

13. The computer storage media of claim 8, the method further comprising training the deep learning model before the receiving of the request, the training of the deep learning model includes:
receiving a set of files that are labeled as distinct sets of malware families or benign files;
emulating the set of files, the emulating includes extracting information from the set of files;
identifying a label for pairs of the set of files as similar or dissimilar in preparation for training; and
based at least in part on the identifying, training the deep learning model, the training includes adjusting weights associated with the deep learning model to indicate an importance of certain features of the set of files for prediction or classification, wherein the training includes learning an embedding of a first file of the similar files in feature space.

14. The computer storage media of claim 13, wherein the similarity score being above the threshold is based at least in part on the learned embedding of the first file.

15. A system comprising:
one or more processors; and
one or more computer storage media storing computer-useable instructions that, when used by the one or more processors, cause the one or more processors to perform a method, the method comprising:
receiving a request to determine whether a computer object contains malicious content;
extracting a plurality of features from the computer object;
determining whether an indication of the computer object is within a threshold distance, in feature space, to a set of known malicious computer objects based on the plurality of features, wherein an embedding of the set of known malicious computer objects in the feature space is learned via training based on learned weights for different features of the set of known malicious computer objects; and at least partially responsive to determining whether the indication of the computer object is within the threshold distance, providing, to a user interface of a computing device, an identifier indicating whether the computer object contains malicious content.

16. The system of claim 15, wherein a set of indicators of the set of known malicious computer objects are scored and provided to the user interface, the providing indicating a likelihood that the computer object is of particular families of malware.

17. The system of claim 15, wherein the feature space also includes indications of benign files and wherein the determination of whether the indication of the computer object is within a threshold distance is based at least in part on analyzing the indications of the benign files.

18. The system of claim 15, wherein the indication includes a vector that is embedded in the feature space based on two branches of a deep learning model that learns a distance function between two inputs, wherein a first input is the vector, and a second input is another vector representing a first malware file of the set of known malicious computer objects.

19. The system of claim 15, wherein the feature space is associated with a deep learning model that includes two identical subnetworks that share weights and that are connected by a distance learning function.

20. The system of claim 15, wherein the feature space is associated with a deep learning model that explicitly accepts, as input, a pair of matching malware files and a non-matching benign file to train on.

* * * * *